US010300775B2

(12) United States Patent
Spencer

(10) Patent No.: US 10,300,775 B2
(45) Date of Patent: May 28, 2019

(54) TONNEAU RAIL SYSTEM WITH AUTOMATIC RAIL COVER SECUREMENT

(71) Applicant: Truxedo, Inc., Yankton, SD (US)

(72) Inventor: Michael R. Spencer, Hubbard, NE (US)

(73) Assignee: TRUXEDO, INC., Yankton, SD (US)

( * ) Notice: Subject to any disclaimer, the term of this patent is extended or adjusted under 35 U.S.C. 154(b) by 0 days.

(21) Appl. No.: 15/790,225

(22) Filed: Oct. 23, 2017

(65) Prior Publication Data

US 2019/0118629 A1  Apr. 25, 2019

(51) Int. Cl.
*B60J 7/19* (2006.01)
*B60J 10/90* (2016.01)
*B60J 7/04* (2006.01)
*B60J 7/16* (2006.01)

(52) U.S. Cl.
CPC ............... *B60J 7/198* (2013.01); *B60J 7/04* (2013.01); *B60J 7/1607* (2013.01); *B60J 10/90* (2016.02)

(58) Field of Classification Search
CPC ..... B60J 7/162; B60J 7/164; B60J 7/04; B60J 7/198; B60J 10/90; B60J 7/1607
USPC ............. 296/100.09, 100.17, 100.18, 100.16
See application file for complete search history.

(56) References Cited

U.S. PATENT DOCUMENTS

| | | | |
|---|---|---|---|
| 4,313,636 A | 2/1982 | Deeds | |
| 5,636,893 A | 6/1997 | Wheatley et al. | |
| 7,252,322 B2 | 8/2007 | Rusu | |
| 8,128,149 B1* | 3/2012 | Wolf | B60J 7/10 160/371 |
| 8,870,190 B1 | 10/2014 | Newhouse | |
| 8,939,494 B2* | 1/2015 | Maimin | B60P 7/04 296/100.07 |
| 9,211,834 B2 | 12/2015 | Facchinello et al. | |
| 9,487,070 B2 | 11/2016 | Xu | |
| 2002/0096268 A1* | 7/2002 | Schmeichel | B60J 7/102 160/328 |
| 2005/0146158 A1* | 7/2005 | Schmeichel | B60J 7/102 296/100.16 |
| 2007/0205629 A1* | 9/2007 | Wheatley | B60J 7/061 296/100.18 |
| 2010/0270824 A1* | 10/2010 | Yue | B60J 7/198 296/100.07 |

(Continued)

OTHER PUBLICATIONS

BAK Industries, Truck Bed Covers, 2016 Catalog, pp. 1-16, 21-24, Jan. 4, 2016.

*Primary Examiner* — Jason S Morrow
(74) *Attorney, Agent, or Firm* — The Dobrusin Law Firm, PC

(57) ABSTRACT

A mounting assembly comprising: (I) a retainer connected to one or more side rails of a cargo box of a vehicle, the retainer having: (i) a receiving portion having an axis; and (ii) a supporting portion extending away from the receiving portion and positioned substantially perpendicular to the axis of the receiving portion; and (II) a rotary member having: (i) a rotary portion rotatably engaged to the receiving portion to rotate about the axis of the receiving portion; (ii) a lever extending away from the rotary portion and positioned substantially perpendicular to the axis of the receiving portion; and (iii) a cover seal connected to the rotary member, the cover seal configured to compressibly engage a tonneau section to create a seal between the rotary member and the tonneau section.

20 Claims, 12 Drawing Sheets

(56) References Cited

U.S. PATENT DOCUMENTS

| | | | |
|---|---|---|---|
| 2011/0169296 A1* | 7/2011 | Schrader | B60J 7/102 |
| | | | 296/100.15 |
| 2015/0061315 A1 | 3/2015 | Facchinello et al. | |
| 2016/0114666 A1 | 4/2016 | Xu | |
| 2016/0288691 A1 | 10/2016 | Aubrey et al. | |
| 2018/0111459 A1* | 4/2018 | Xu | B60J 7/1858 |

* cited by examiner

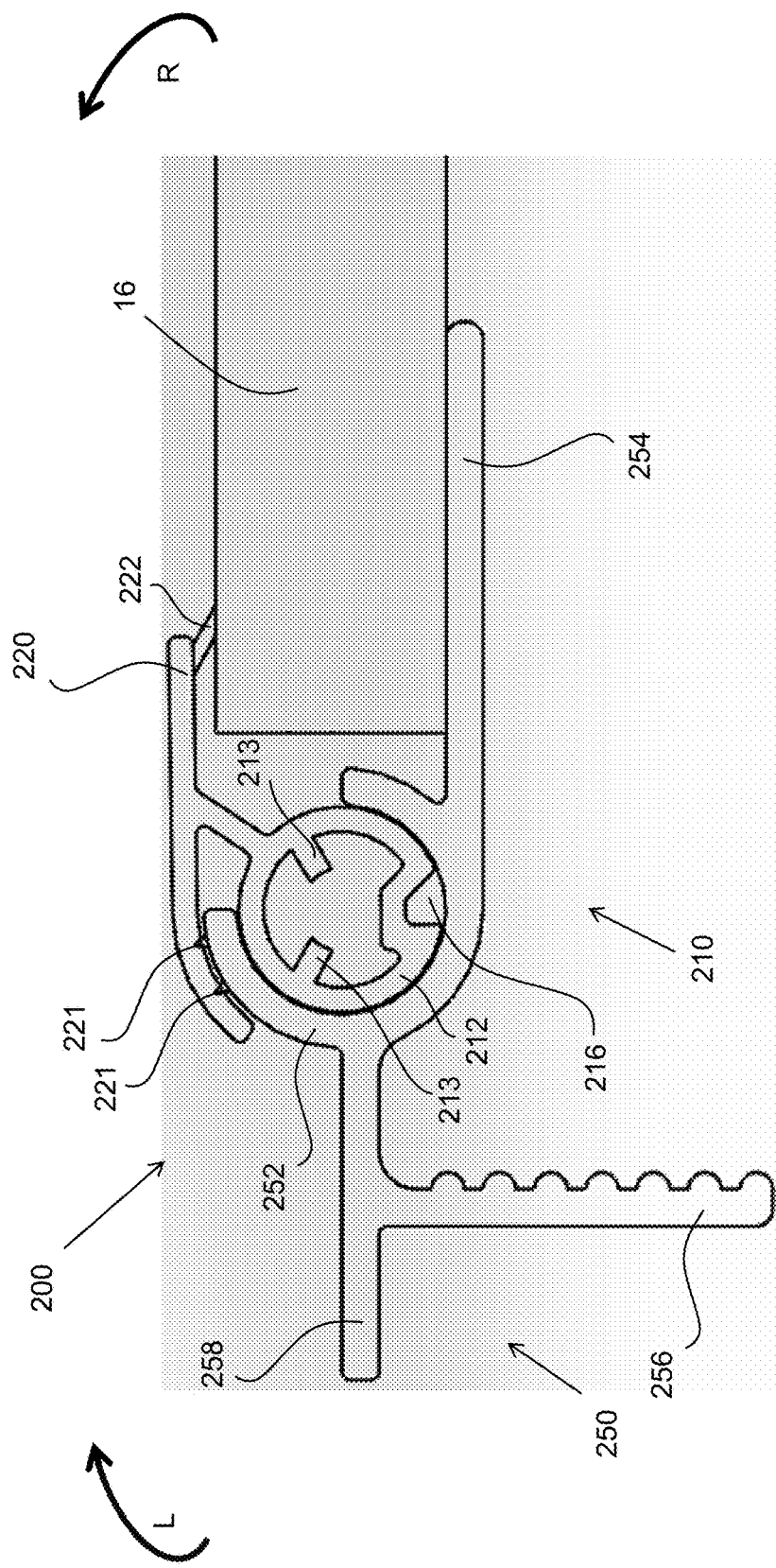

TONNEAU RAIL SYSTEM WITH AUTOMATIC RAIL COVER SECUREMENT

FIELD

The present teachings generally relate to a tonneau system for a vehicle, and more specifically, mounting assemblies to secure a tonneau system to a vehicle.

BACKGROUND

Tonneau systems are typically used to cover and protect a cargo bed or unoccupied portion of a vehicle from environmental degradation. Typical tonneau systems include a plurality of structural members that are attached directly to the vehicle to form a frame. A cover is then secured to the frame, preventing moisture, debris, or unwanted objects from entering the cargo bed or unoccupied portion and damaging cargo or the vehicle itself. The tonneau system may include a rigid frame design, such that when fully assembled and attached to the vehicle, the frame creates a unitary structure. The tonneau system may also include one or more hinge-points so that the frame can remain partially attached to the vehicle, yet be folded onto itself to uncover only a portion of the cargo bed or unoccupied portion. Alternatively, the tonneau system may include a flexible, continuous cover so that the cover may be rolled onto itself, uncovering a desired portion of the cargo bed or unoccupied portion.

Tonneau frames may be attached to a vehicle using a variety of mechanical fasteners, such as snap-fit clips, bolts, screws, hooks, or a combination thereof. Frequently, to ensure a tightly secured connection between the frame and the vehicle, the tonneau system will use a plurality of latches to secure side members and cross bow members to an interior lip of the vehicle bed. Often each latch is inserted into a side member and cross bow member and manually tightened by a user to ensure a snug fit between the tonneau cover and the vehicle.

The latches are frequently under distress from the compression force between the frame and the vehicle, or daily operation of the vehicle (e.g., driving and loading/unloading the cargo bed). As a result, the latches my fracture, be damaged, or untighten from the tonneau system, resulting in the cover loosening or shifting in position, causing the cargo bed or unoccupied portion to be exposed to environmental elements. Additionally, during installation of the conventional latching system, it may be difficult to maintain proper orientation of the cover relative to the cargo bed and ensure flush mounting because each latch is an individual component requiring manual insertion and tightening.

In addition to the latching system being difficult to properly install and maintain, the latches are frequently mounted underneath the cover so that the cover rests along a top lip of the vehicle bed or remains flush with the top lip of the vehicle bed. As a result, the installation often leaves cracks or crevices in which moisture or debris can enter the vehicle bed, even when properly installed.

Examples of tonneau systems may be found in U.S. Pat. Nos. 4,313,636 and 9,211,834; and US Publication Nos. 2015/0061315 and 2016/0288691, all of which are incorporated by reference herein for all purposes. It would be attractive to have a tonneau system in which the mounting assembly secures the cover to the vehicle free of manual tightening. What is needed is a mounting assembly that secures the cover to the vehicle when one or more portions of the tonneau system are placed on the mounting assembly. It would be attractive to have a tonneau system that prevents moisture or debris from entering the vehicle bed. What is needed is a mounting assembly that includes one or more seals to seal the cracks or crevices between the cover and the vehicle bed. It would be attractive to have a mounting assembly that maintains a compression force between one or more portions of the tonneau sections and the vehicle. What is needed is a mounting assembly that includes a biased locking member to maintain a compressed position between the one or more portions of the tonneau system and the vehicle.

SUMMARY

The present teachings meet one or more of the present needs by providing: a mounting assembly comprising: (I) a retainer connected to one or more side rails of a cargo box of a vehicle, the retainer having: (i) a receiving portion having an axis; and (ii) a supporting portion extending away from the receiving portion and positioned substantially perpendicular to the axis of the receiving portion; and (II) a rotary member having: (i) a rotary portion rotatably engaged to the receiving portion to rotate about the axis of the receiving portion; (ii) a lever extending away from the rotary portion and positioned substantially perpendicular to the axis of the receiving portion; and (iii) a cover seal connected to the rotary member, the cover seal configured to compressibly engage a tonneau section to create a seal between the rotary member and the tonneau section; wherein, when a surface of the tonneau section is positioned on the supporting portion, the lever is engaged to rotate the rotary member so that the cover seal compressibly engages the tonneau section and an engaging portion of the rotary member abuts an opposing surface of the tonneau section to secure the tonneau system between the engaging portion and the receiving portion.

The present teachings meet one or more of the present needs by providing: a mounting assembly comprising: (I) a retainer connected to one or more side rails of a cargo box of a vehicle, the retainer having: (i) a receiving portion having an axis; and (ii) a supporting portion extending away from the receiving portion and positioned substantially perpendicular to the axis of the receiving portion; (II) a rotary member having: (i) a rotary portion rotatably engaged to the receiving portion to rotate about the axis of the receiving portion; (ii) a lever extending away from the rotary portion and positioned substantially perpendicular to the axis of the receiving portion; and (iii) a cover seal connected to the rotary member, the cover seal configured to compressibly engage a tonneau section to create a seal between the rotary member and the tonneau section; and (III) a toggle latch located adjacent to the rotary member, the toggle latch having: (i) a rotary portion; and (ii) a tooth; wherein, when a surface of the tonneau section is positioned on the supporting portion, the lever is engaged to rotate the rotary member so that the cover seal compressibly engages the tonneau section and an engaging portion of the rotary member abuts an opposing surface of the tonneau section to secure the tonneau section between the engaging portion and the receiving portion; and wherein the toggle latch is rotated about an axis of the rotary portion of the toggle latch towards a groove of the rotary portion so that the tooth engages the groove and prevents unwanted rotation of the rotary member.

The present teachings provide: a method, comprising: (I) attaching one or more mounting assemblies to the cargo box of the vehicle; (II) inserting the tonneau section into the latch assemblies so that the surface of the tonneau section rests on the supporting portion of each of the mounting assemblies; (III) rotating the rotary member so that the engaging portion abuts the opposing surface of the tonneau section and the cover seal compressibly engages the tonneau section; and (IV) rotating the toggle latch to engage the tooth of the toggle latch with the groove of the rotary member.

The present teachings provide a tonneau system in which the mounting assembly secures the cover to the vehicle free of manual tightening. The present teachings provide a mounting assembly that secures the cover to the vehicle when one or more portions of the tonneau system are placed on the mounting assembly. The present teachings provide a tonneau system that prevents moisture or debris from entering the vehicle bed. The present teachings provide a mounting assembly that includes one or more seals to seal the cracks or crevices between the cover and the vehicle bed. The present teachings provide a mounting assembly that maintains a compression force between one or more portions of the tonneau sections and the vehicle. The present teachings provide a mounting assembly that includes a biased locking member to maintain a compressed position between the one or more portions of the tonneau system and the vehicle.

BRIEF DESCRIPTION OF THE DRAWINGS

FIG. 12 is a cross-sectional view of a mounting assembly secured to a tonneau section in a locked position.

DETAILED DESCRIPTION

Figure 1:
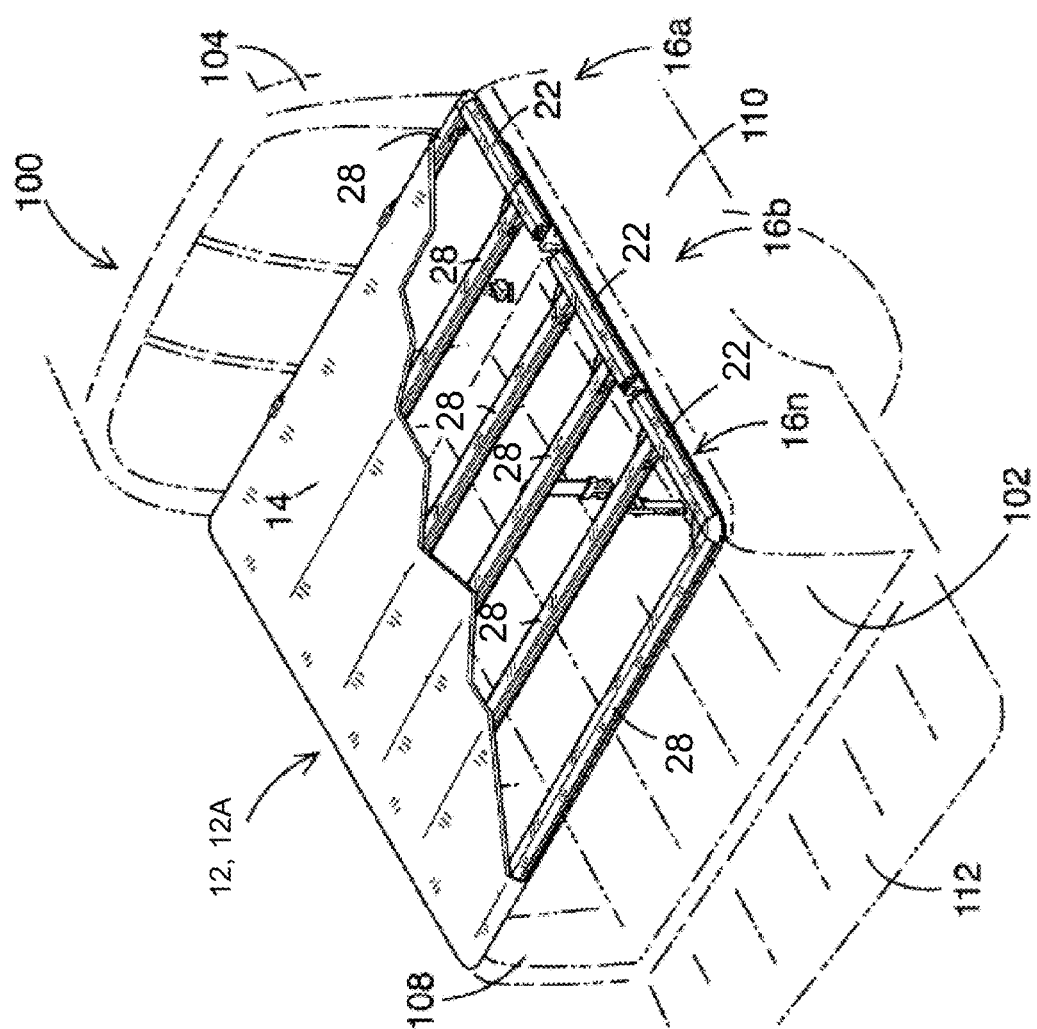
FIG. 1 is a perspective view of a foldable tonneau cover positioned upon a cargo box of a pickup truck.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled.

The disclosures of all articles and references, including patent applications and publications, are incorporated by reference for all purposes. Other combinations are also possible as will be gleaned from the following claims, which are also hereby incorporated by reference into this written description.

The present teachings relate to a tonneau system that secures to a cargo bed or unoccupied portion of a vehicle (i.e., a portion of the vehicle adjacent to or outside of a passenger cabin)(hereinafter referred to as "cargo box"). The tonneau system is adapted to attach to a cargo box of a pickup truck. The cargo box may consist of one or more sidewalls, one or more tailgates, or both. The one or more sidewalls, one or more tailgates, or both may include one or more mating surfaces. For example, the sidewalls may include a vertical lip substantially perpendicular to the ground and configured to mate with a surface of one or more mounting assemblies. The tonneau system may consist of a plurality of tonneau sections. The tonneau sections may be interlocked such that one or more of the tonneau sections are adapted to fold onto one or more additional tonneau sections (i.e., a foldable tonneau system). For example, the tonneau sections may be connected by one or more dual linkage hinge assemblies so that the tonneau sections may fold onto one another by pivoting the hinges of the dual linkage hinge assemblies. The tonneau sections may be connected using a plurality of side members, cross bow members, or both. Each tonneau section may include one or more side members, one or more cross bow members, or both. The one or more side members, one or more cross bow members, or both may connect to the cargo box using one or more mounting assemblies. The tonneau system may be unitary (i.e., a single connected piece), or may consist of a plurality of tonneau sections. The tonneau system may be structurally rigid. For example, the tonneau system may be sufficiently rigid to prevent an object, such as a heavy stone, from damaging the tonneau system and entering the cargo box. The tonneau system may be flexible such that the one or more sections of the tonneau system are movable while a portion of the tonneau system remains stationary. The tonneau system may be sufficiently flexible so that the tonneau system may be rolled onto itself (i.e., a rollable tonneau system). The tonneau system may comprise a uniform material, or may comprise a plurality of materials. For example, the tonneau system may include metal side members and cross bow members, yet have plastic mounting assemblies. Each component of the tonneau system may be a single material, or may comprise a plurality of materials. The tonneau system may include a cover.

The cover functions to prevent moisture or debris from entering the cargo box or other compartment of a vehicle, such as a pickup truck. The cover may be configured to protect the cargo box or other compartment from environmental degradation. The environmental degradation may be corrosion, rust, mold/mildew, or a combination thereof, caused by precipitation and other environmental elements. The cover may be attached to one or more side members, one or more cross bow members, one or more additional supporting members, or a combination thereof. The cover may be attached by fasteners, adhesives, or a combination thereof. The fasteners may be screws, bolts, nuts, nails, press-fit clips/buttons, hooks, latches, or a combination thereof. The adhesives may be glue, epoxy, polyurethane, cyanoacrylate, or a combination thereof. The cover may be flexible. The cover may be a continuous piece. For example, the cover may be a fabric that is rolled across a frame created by one or more side members, one or more cross bow members, or both, and attached to the frame in an unrolled state. The cover may be structurally rigid such that the cover deflects objects to prevent flexing or piercing of the cover. The cover may be a fabric, metal, or both. The cover may comprise a plurality of segments that make up the cover to form a cover attachment assembly. For example, the cover may include a plurality of individual sections that, when installed, are connected (e.g., fastened together) to form a unitary cover. The cover may include one or more seams. The cover may be free of seams. The cover may removably attach to the tonneau system such that the cover may be replaced without uninstalling the tonneau system. The cover may be secured to one or more side members such that the cover spans an entire opening of the cargo box.

The side members may function to create a peripheral frame for the tonneau system. The side members may be configured to secure the tonneau system to the cargo box, vehicle (e.g., a pickup truck), or both. For example, the side members may be received by one or more mounting assemblies to secure the tonneau system to the cargo box. The side members may be configured to support one or more cross bow members. The one or more cross bow members may span between one or more side members positioned on opposing sides of the cargo box. The side members may vary in length and width depending on the desired attachment shape. A length of the cargo box may require a plurality of side members of a shorter length to reach the total length of the cargo box. The side members may secure to one or more surfaces, one or more lips, one or more edges, or a combination thereof of the cargo box. Alternatively, the side members may secure to one or more surfaces, one or more receiving features, or a combination thereof of one or more mounting assemblies. For example, a cover may be disposed across one or more side members, and the side members are inserted into a mounting assembly adapted to clamp the side members and cover to a surface of the cargo box. The side members may be positioned substantially parallel to a perimeter shape of the cargo box. The side members may be secured to the cargo box using one or more fasteners such as screws, bolts, nails, rivets, clamps, latches, hook and loop fasteners, or a combination thereof. The side members may be secured to the cargo box using one or more adhesives such as glue, epoxy, polyurethane, cyanoacrylate, or a combination thereof. Alternatively, the side members may be integrally formed with the sidewalls, tailgate, or both of the cargo box. For example, the side members may be a surface of the sidewalls, tailgate or both that is substantially perpendicular to a height of the sidewalls, tailgate or both, and the sidewalls may have a thickness substantially similar to a thickness of the sidewalls, tailgate, or both. The side members may be made of metal, plastic, or both. The side members may be solid or may be hollow. The side members may include one or more attachment points to connect to and/or receive a portion of one or more cross bow members. The side members may be connected to each other by one or more hinges such that one or more tonneau sections are adapted to fold onto one another. For example, a pair of side members may be positioned on opposing sidewalls of the cargo box to support opposing sides of a tonneau section and be configured to fold a front tonneau section onto one or more additional tonneau sections (e.g., a middle tonneau section, a rear tonneau section, or both). A pair of side members may secure one or more cross bow members spanning between the pair of side members.

The cross bow members may function to span across a length or width of the cargo box to support the tonneau system. The cross bow members may be configured to attach to one or more side members to form an interior frame of the tonneau system. The cross bow members may be configured to secure the tonneau system to the cargo box, the vehicle, or both. The cross bow members may secure the tonneau system to the cargo box, the vehicle, or both using one or more mounting assemblies. For example, the cross bow members may connect to the cargo box by a plurality of mounting assemblies creating a compression force between the cross bow members and the cargo box. The cross bow members may include one or more attachment points to connect to and/or receive a portion of one or more side members. The cross bow members may have a shape substantially similar to one or more side members. The cross bow members may have a shape dissimilar to the side members. The cross bow members may include one or more supports for additional stiffness. For example, the cross bow members may include one or more legs that contact a bed of the cargo box to substantially eliminate flex of the cross bow member near a midpoint of the cross bow member. The cross bow members may be made of metal, plastic, or both. The cross bow members may be solid or may be hollow. The cross bow members may be partially supported by one or more mounting assemblies.

The mounting assembly functions to secure a portion of the tonneau system (e.g., a tonneau section) to a cargo box of a vehicle. The mounting assembly may directly or indirectly secure the tonneau sections to the cargo box. For example, a tonneau section may rest on a surface of one or more sidewalls and the mounting assembly compressibly secures the tonneau section to the surface of the one or more sidewalls. Alternatively, the mounting assembly may be mounted to a portion of the cargo box (i.e., to the one or more sidewalls), and one or more tonneau sections may rest on a surface of the mounting assemblies, thereby indirectly connecting the tonneau sections to the cargo box. The mounting assembly may be a unitary piece or may contain a plurality of components. For example, the mounting assembly may include a rotary member, a toggle latch, a retainer, or a combination thereof. The mounting assembly may engage one or more tonneau sections when the tonneau sections make contact with the mounting assembly. For example, the tonneau sections may be placed on a surface of the mounting assembly, resulting in a portion of the mounting assembly securing the tonneau section in place. The mounting assembly may be configured to receive a single tonneau section or a plurality of tonneau sections. For example, the mounting assembly may receive a front tonneau section and a middle tonneau section when the tonneau sections abut one another on an adjacent peripheral edge. Alternatively, the mounting assembly may receive a plurality of tonneau sections in a folded state (e.g., a front tonneau section is folded onto a top surface of a middle tonneau section). One or more mounting assemblies may be required to install the tonneau system. For example, a plurality of mounting assemblies may be secured along sidewalls of the cargo box to support the tonneau system. Alternatively, a pair of opposing mounting assemblies may span a length of each of the sidewalls to support opposing edges of the tonneau system (i.e., a plurality of tonneau sections connected together).

The mounting assembly may be secured to one or more sidewalls, one or more tailgates, or both. The mounting assembly may be secured to a portion of the passenger cabin or vehicle other than the one or more sidewalls or one or more tailgates. For example, the mounting assembly may be fastened to an exterior surface of the passenger cabin so that the mounting assembly is positioned over a peripheral edge of the cargo box. The mounting assembly may be secured to the cargo box using one or more fasteners, one or more adhesives, or both. The fasteners may be screws, bolts, nuts, nails, press-fit clips/buttons, hooks, latches, or a combination thereof. The adhesives may be glue, epoxy, polyurethane, cyanoacrylate, or a combination thereof. The mounting assembly may be secured to the cargo box free of one or more fasteners, one or more adhesives, or both. For example, the mounting assembly may include a protrusion that is received by a key-hole slot on a surface of the cargo box. The mounting assembly may include one or more mating surfaces to mate with a surface of the cargo box. For example, the mounting assembly may include a retainer that mates to a sidewall of the cargo box.

The retainer functions to abut one or more surfaces of the cargo box so that the mounting assembly may be secured to the cargo box. The retainer functions to support one or more tonneau sections and secure the tonneau sections to the cargo box. The retainer may include one or more projections, one or more protrusions, or both that mate to a surface of the cargo box. For example, the retainer may include a projection that is positioned substantially parallel to a vertical lip of the sidewall of a cargo box so that, when installed, the mounting assembly abuts the vertical lip of the sidewall in a flush manner (i.e., the abutment is free of gaps between the mounting assembly and the vertical lip). The retainer may be a unitary piece or may comprise a plurality of components. For example, the retainer may be a single injection-molded piece having a plurality of integrated projections. Alternatively, the retainer may include a body having one or more projections fastened or adhered to a surface of the body. The retainer may be metal, plastic, or both. The metal may be aluminum, copper, steel, iron, tin, bronze, or a combination thereof. The plastic may be polyamide, polycarbonate, polyester, polyethylene, polypropylene, polystyrene, polyurethane, polyvinyl, or a combination thereof. The retainer may be solid or may be hollow. The retainer may be structurally rigid or may be flexible. For example, one or more projections of the retainer may flex during installation to prevent fracturing of the projection. Alternatively, the retainer may be sufficiently rigid to support one or more tonneau sections, one or more users, additional items, or a combination thereof. The retainer may be configured to support about 100 pounds or more, about 200 pounds or more, or about 300 pounds or more. The retainer may be configured to support about 600 pounds or less, about 500 pounds or less, or about 400 pounds or less. The retainer may include one or more contoured surfaces. The retainer may be sufficiently free of contoured surfaces (e.g., the surfaces of the retainer are substantially flat). The retainer may include a receiving portion, a supporting portion, a mounting portion, or a combination thereof.

The mounting portion functions to abut a surface of the cargo box and maintain a position of the mounting assembly relative to the cargo box. The mounting portion may mate with the one or more sidewalls, one or more tailgates, or both. The mounting portion may extend at an angle substantially perpendicular to the one or more sidewalls, one or more tailgates, or both. The mounting portion may extend at an angle other than substantially perpendicular to the one or more sidewalls, one or more tailgates, or both. For example, the angle between the mounting portion and the one or more sidewalls, one or more tailgates, or both may be about 30 degrees or more, about 45 degrees or more, or about 60 degrees or more. The angle may be about 135 degrees or less, about 120 degrees or less, or about 105 degrees or less (e.g., about 90 degrees). The mounting portion may be structurally rigid to support one or more tonneau sections, one or more users, other items, or a combination thereof. The mounting portion may be flexible to prevent fracturing of the mounting portion when the vehicle is being operated (e.g., while the vehicle is driven). The mounting portion may be integrally formed with the retainer or may be a secondary component secured to the retainer. The mounting portion may include one or more surfaces that have a similar contour to one or more surfaces of the cargo box. For example, the sidewall of the cargo box may include a convex surface while the mounting portion includes a concave surface to mate with the sidewall. The mounting portion may be configured to prevent unwanted movement of the retainer. For example, the mounting portion may rest on a top surface of the sidewalls so that the retainer does not slide along a vertical lip of the sidewalls. The mounting portion may be removably attached to the cargo box via one or more fasteners, one or more adhesives, or both. The mounting portion may be free of one or more fasteners, one or more adhesives, or both. For example, the mounting portion may rest on a surface of the cargo box while a contoured projection of the retainer is fastened to the cargo box.

The contoured projection functions to abut one or more surfaces of the cargo box so that the retainer may be secured to the cargo box. The contoured projection may be fixedly or removably attached to the cargo box. The contoured projection may be secured to the cargo box using one or more adhesives, one or more fasteners, or both. The contoured projection may include one or more contoured surfaces, one or more substantially flat surfaces, or both. For example, the contoured projection may include a substantially flat surface to abut a vertical lip of a sidewall, and also include an opposing contoured surface configured to engage one or more fastener grooves. The contoured surface and substantially flat surface may be opposing sinds of the contoured projection. The contoured projection may include one or more abrasive surfaces to increase friction between the contoured projection and one or more fasteners. The one or more abrasive surfaces may be complementary in shape to a shape of a gripping portion of the one or more fasteners. For example, the one or more abrasive surfaces may be grooves and the gripping portion may include grooves, and the grooves of the gripping portion may extend into the grooves of the abrasive surface. The contoured projection may extend at an angle substantially perpendicular to the mounting portion such that the contoured projection and the mounting portion form a right angle. The contoured projection may extend at an angle other than substantially perpendicular to the mounting portion. For example, the angle between the contoured projection and the mounting portion may be about 30 degrees or more, about 45 degrees or more, or about 60 degrees or more. The angle may be about 135 degrees or less, about 120 degrees or less, or about 105 degrees or less. The contoured projection may be structurally rigid or flexible. The contoured projection may be compressible so that the contoured projection is compressed when one or more fasteners secure the contoured projection to the cargo box. The contoured projection may include one or more secondary projections that engage one or more portions of the cargo box. For example, a vertical lip of a sidewall may include a keyhole slot configured to receive a key (i.e., a secondary projection) of the contoured projection. The contoured projection may be secured to cargo box using one or more clamps.

The one or more clamps may function to secure the mounting assembly to the cargo box. The clamps may be configured to clamp the contoured projection to a vertical lip of one or more sidewalls of the cargo box. The clamps may include one or more opposing arms configured to create a compression force between the contoured projection or other portion of the retainer and the cargo box. The opposing arms may be substantially parallel to each other, or may be in a position other than substantially parallel to each other. The opposing arms may create a compression force between the retainer and a portion of the cargo box of about 50 newtons or more, about 100 newtons or more, or about 150 newtons or more. The opposing arms may create a compression force between the retainer and a portion of the cargo box of about 300 newtons or less, about 250 newtons or less, or about 200 newtons or less. One or more arms of the clamps may include a plurality of grooves to maintain position of the clamp relative to the retainer, the cargo box, or both. For example, one or more arms of the clamp may include a plurality of grooves configured to mate with a contoured surface of the contoured projection. The one or more arms of the clamp may be pivotally engaged to one another. For example, an end portion of a first arm may be received by a projection portion of a second arm, such that the first and second arm are pivotally engaged to each other to create a gap between the arms to receive the retainer, the a portion of the cargo box (i.e., a thickness of the vertical lip), or both. The gap created may be about 15 mm or more, about 30 mm or more, or about 45 mm or more. The gap created may be about 90 mm or less, about 75 mm or less, or about 60 mm or less. The one or more arms may be pivotally engaged using one or more bearings, one or more ball and socket joints, one or more hinges, or a combination thereof. The one or more arms may be free of pivotal engagement. For example, one or more fasteners, one or more washers, or both, may be secured to opposing arms such that, when the one or more fasteners are torqued, compression between the opposing arms is created. The one or more clamps may secure the mounting assembly to the cargo box so that one or more tonneau sections are supported by a supporting portion of the retainer.

The supporting portion functions to support one or more tonneau sections of the tonneau system. The supporting portion may function to compressibly secure one or more tonneau sections when coupled with one or more rotary members of the mounting assembly. The supporting portion may be positioned substantially perpendicular to the contoured projection of the retainer such that the supporting portion and contoured projection form a right angle. The supporting portion may extend at an angle other than substantially perpendicular to the contoured portion. For example, the angle between the supporting portion and the contoured portion may be about 30 degrees or more, about 45 degrees or more, or about 60 degrees or more. The angle may be about 135 degrees or less, about 120 degrees or less, or about 105 degrees or less. The supporting portion may be structurally rigid or may be flexible. The supporting portion may be configured to support about 45 kilograms or more, about 90 kilograms or more, or about 135 kilograms or more. The supporting portion may be configured to support about 260 kilograms or less, about 215 kilograms or less, or about 170 kilograms or less. A surface of the supporting portion may abut a surface of one or more tonneau sections. For example, a top surface of the supporting portion may abut a bottom surface of one or more tonneau sections. The supporting portion may support a portion of the one or more tonneau sections, or may support an entire surface of the one or more tonneau sections (e.g., about 100% of a bottom surface of one or more tonneau sections is supported by the supporting portion). The supporting portion may support about 5% of the tonneau sections or more, about 10% of the tonneau sections or more, or about 15% of the tonneau covers or more. The supporting portion may support about 30% of the tonneau cover or less, about 25% of the tonneau cover or less, or about 20% of the tonneau cover of less. The supporting portion may include one or more abrasive surfaces to increase friction between the supporting portion and the one or more tonneau sections. The supporting portion may include one or more holes, grooves, notches, contours, latches, hooks, or a combination thereof to secure the one or more tonneau sections to the supporting portion. The supporting portion may include one or more adhesives to secure the one or more tonneau sections to the supporting portion. For example, the supporting portion may include a contact adhesive on a top surface that contacts a bottom surface of the one or more tonneau sections. The supporting portion may be positioned so that one or more tonneau sections are aligned to substantially follow a peripheral edge of the cargo box (i.e., the perimeter established by the one or more sides, one or more tailgates, exterior wall of a passenger cabin, or a combination thereof. The supporting portion may extend from a receiving portion of the retainer.

The receiving portion functions to receive and rotatably secure a rotary portion of a rotary member. The receiving portion may be configured to rotatably engage a rotary member such that the rotary member rotates about an axis of the receiving portion. The receiving portion may be configured to secure the rotary portion so that the rotary portion pivots about an axis of the receiving portion, the rotary portion, or both. The receiving portion may allow about 30 degrees or more of rotation of the rotary portion, about 60 degrees or more of rotation of the rotary portion, or about 90 degrees or more of rotation of the rotary portion. The receiving portion may allow about 180 degrees or less of rotation of the rotary portion, about 150 degrees or less of rotation of the rotary portion, or about 120 degrees or less of rotation of the rotary portion. The receiving portion may be shaped to mate to a surface of the rotary portion. For example, the receiving portion may be substantially circular and configured to receive a substantially circular shape of the rotary portion. The receiving portion may be square, oval, rectangular, triangular, trapezoidal, or a combination thereof. The receiving portion may include one or more substantially flat surfaces or may be free of substantially flat surfaces. The receiving portion may form a channel so that the rotary portion may be inserted into the channel. For example, the receiving portion may form a "C" shaped channel, "G" shaped channel, "U" shaped channel, or a combination thereof. The receiving portion may include one or more protrusions that secure to the rotary portion or another component of the rotary member. For example, the receiving portion may include a ball joint so that a socket of the rotary member may engage a ball and allow rotation and pivotal movement of the rotary member. The receiving portion may include one or more cavities, one or more holes, one or more sockets, one or more orifices, or a combination thereof to receive a portion of the rotary member. The receiving portion may be structurally rigid or may be flexible. For example, the receiving portion may form a "C" shaped channel so that, when a rotary portion is pushed into an opening of the channel, the receiving portion flexes to expand a width of the opening for receiving the rotary portion, and contracts to decrease the width of the opening once the rotary portion is positioned within the channel. The receiving portion may include one or more fasteners, one or more adhesives, or both to secure the rotary portion or another component of the rotary member. The receiving portion may be free of one or more fasteners, one or more adhesives, or both. The receiving portion may removably attach to the rotary member so that a user may replace the rotary member without uninstalling the retainer from the cargo bed.

The rotary member functions to compressibly secure one or more tonneau sections of the tonneau system. The rotary member functions to create a seal between the one or more tonneau sections and the cargo box. The rotary member may include one or more rotary portions, one or more seals, one or more engaging portions, or a combination thereof. The rotary member may be a unitary piece or may include a plurality of subcomponents. For example, the rotary member may be a solid injection-molded piece. Alternatively, the rotary member may include a body having a plurality of components fastened to the body. The rotary member may engage one or more portions of the retainer, one or more tonneau sections, or a combination thereof. The rotary member may abut one or more surfaces of the one or more tonneau sections. For example, the rotary member may contact one or more sides of the tonneau sections, a bottom surface of the tonneau section (i.e., a surface contacting the supporting portion of the retainer), a top surface of the tonneau sections (i.e., a surface opposing the bottom surface), or a combination thereof. A plurality of rotary members may be secured to a single retainer. Alternatively, a single rotary member may be secured to a single retainer, a plurality of retainers, or both. The rotary member may be made from metal, plastic, or a combination thereof. The metal may be steel, iron, copper, tin, bronze, tungsten, nickel, or a combination thereof. The plastic may be polyamide, polycarbonate, polyester, polyethylene, polypropylene, polystyrene, polyurethane, polyvinyl, or a combination thereof. The rotary member may be made from a unitary material, or may comprise a plurality of materials. For example, a rotary portion of the rotary member may be made from plastic while a biasing member may be made from metal. The rotary member may include a rotary portion that secures to the receiving portion of the retainer.

The rotary portion functions to rotatably secure the rotary member to the receiving portion of the retainer. The rotary portion functions to pivot or rotate the rotary member so that the rotary member engages the one or more tonneau sections. The rotary portion may be configured to connect to a part of the retainer (e.g., the receiving portion, the supporting portion, the contoured projection, the mounting portion, or a combination thereof). The rotary portion may be adapted to rotate about an axis of the rotary portion, the receiving portion, or both. The rotary portion may be adapted to rotate about 30 degrees or more, about 60 degrees or more, or about 90 degrees or more. The rotary portion may be adapted to rotate about 180 degrees or less, about 150 degrees or less, or about 120 degrees or less. The rotary portion may be substantially circular, square, rectangular, oval, trapezoidal, or a combination thereof. The rotary portion may include one or more projections, one or more grooves, one or more protrusions, or a combination thereof. The rotary portion may be structurally rigid or may be flexible. The rotary portion may be compressible. The rotary portion may include one or more abrasive surfaces to increase friction between the rotary portion and the receiving portion. The rotary portion may include one or more friction modifiers such as lubricant, grease, oil, or a combination thereof to decrease friction between the rotary portion and the receiving portion. The rotary portion may be free of friction modifiers. For example, the rotary portion and the receiving portion may both be plastic parts and the rotary portion may be configured to slide along the receiving portion. The rotary portion may have a length (i.e., a distance of the rotary portion substantially parallel to one or more sidewalls of the cargo box) substantially similar to a length of the one or more sidewalls, one or more retainers, or a combination thereof. The rotary portion may have a length less than one or more sidewalls, one or more retainers, or both. For example, a plurality of rotary members each having a rotary portion may abut one another along a longitudinal axis of the rotary portions that have a total length approximately the same as the one or more sidewalls, one or more retainers, or both. The rotary portion may include one or more biasing members.

The biasing member functions to bias the rotary member in a desired position. For example, the biasing member may bias the rotary member in an open position so that one or more tonneau sections may be inserted into the mounting assembly. Alternatively, the biasing member may bias the rotary member in a closed position so that the rotary member compressibly contacts the one or more tonneau sections secured on one or more retainers. The biasing member may bias the rotary member in a position between an open position and a closed position. The biasing member may bias the rotary member in a position other than between an open position and a closed position. The biasing member may be located within a channel or cavity of the rotary member. For example, the rotary member may be substantially cylindrical and a biasing member is positioned within a cavity of the rotary member. The biasing member may be directly or indirectly attached to the rotary member. For example, the biasing member may be attached to one or more projections extending towards an axis of the rotary portion. The projections may include one or more mechanical fasteners (e.g., latches, hooks, grooves, teeth, etc.) to secure the biasing member. The biasing member may be located outside of the rotary portion and connected to an exterior surface of the rotary portion, retainer, or both. The biasing member may be a torsion spring, coil spring, compression spring, linear spring, extension spring, elastic member, or a combination thereof. The biasing member may bias an engaging portion of the rotary member in an open position so that one or more tonneau sections may be placed between the engaging portion and the supporting portion of the retainer.

The engaging portion functions to compressibly secure one or more tonneau sections between the engaging portion and the retainer. The engaging portion may be configured to prevent unwanted movement of one or more tonneau sections during use of the vehicle (i.e., driving the vehicle), use of the tonneau system, use of the cargo box, or a combination thereof. For example, the engaging portion may prevent one or more tonneau sections from shifting from a position substantially abutting one or more sidewalls of a cargo. The engaging portion may be substantially parallel to a longitudinal axis of the rotary member. The engaging portion may extend from the rotary member. The engaging portion may include one or more substantially flat surface to mate with a surface of the one or more tonneau sections. The engaging portion may include one or more contoured surfaces. For example, the engaging portion may include a curved section configured to pivot about an axis of the rotary portion and follow the curvature of the receiving portion of the retainer. The engaging portion may be structurally rigid to create the compression force on one or more tonneau sections supported by the supporting portion of the retainer. The engaging portion may be configured to contact one or more tonneau sections when the rotary member is rotated to a locking position. The engaging portion may include one or more rotary seals to seal a gap between the engaging portion and the receiving portion of the retainer.

The rotary seals function to seal a gap between the engaging portion and the receiving portion to prevent moisture, debris, or other objects from entering an interior portion of the receiving portion. The rotary seals may be structurally rigid. The rotary seals may be flexible so that the seals compress when contacting the receiving portion. For example, the rotary seals may be flexible and configured to slide along an exterior surface of the receiving portion when the rotary member is rotated between a locked position and an unlocked (i.e., release) position, or vice versa. The rotary seals may be made from metal, plastic, rubber, silicone, fluorocarbon, or a combination thereof. The rotary seals may include a primary rotary seal and a secondary rotary seal. For example, a primary rotary seal may be positioned near an opening of a gap between the engaging portion of the rotary member and the receiving portion of the retainer, while a secondary rotary seal is positioned behind the first rotary seal relative to the opening so that, if the primary rotary seal fails (i.e., allows moisture, debris, or other items to enter the gap), the secondary rotary seal still prevents the moisture, debris, or other items from entering an interior portion of the receiving portion, rotary portion, or both. The rotary seals may one or more seals extending along the engaging portion, the receiving portion, or both to seal a gap between the receiving portion and the engaging portion. The rotary seals may be integrally formed with one or more portions of the rotary member, or may be attached to the rotary member. For example, the rotary seals may be adhered to a surface of the rotary portion. Alternatively, the rotary seals may be integrally formed with the receiving portion of the retainer, or may be attached to the rotary member. The rotary seals may be fastened to a surface of the rotary portion. The rotary seals may be secured in a groove or slot of the engaging portion, the receiving portion, or both configured to receive the rotary seals. The rotary seals may protect the rotary member from moisture, debris, other items, or a combination thereof in conjunction with a cover seal.

The cover seal functions to prevent moisture, debris, or other objects from penetrating an interior portion of the mounting assembly (e.g., the rotary member, retainer, toggle latch, or a combination thereof). The cover seal functions to create a seal between the mounting assembly and one or more tonneau sections. The cover seal may create a seal between the mounting assembly and one or more tonneau sections when the rotary member is moved to a locked position. For example, one or more tonneau sections may be placed on a supporting portion of the retainer, and the rotary member may be rotated to a locked position so that the cover seal compressibly contacts a surface of the one or more tonneau sections. The cover seal may form a seal with a top surface, a bottom surface, or side surfaces of the one or more tonneau sections. The cover seal may be structurally rigid or may be flexible. For example, the cover seal may be flexible and configured to form an interference-fit (i.e., the cover seal contacts the tonneau sections so that the cover seal is compressed) with one or more surfaces of one or more tonneau sections. The cover seal may extend from a surface of the rotary member. The cover seal may be substantially straight (e.g., a substantially straight portion projecting from a surface of the rotary member). The cover seal may include one or more bends, angles, protrusions, or a combination thereof. The cover seal may extend a length of the one or more tonneau sections (i.e., a distance of the one or more tonneau sections substantially parallel to one or more sidewalls of the cargo box). The cover seal may be a plurality of shorter cover seals that have a combined length of the one or more tonneau sections. The cover seal may contact the one or more tonneau sections at an angle substantially parallel to a top surface of the one or more tonneau sections (i.e., a surface substantially parallel to the supporting portion of the retainer). The cover seal may contact a side surface of the one or more tonneau sections (i.e., a surface substantially perpendicular to the supporting portion of the retainer) at a substantially right angle (approximately 90 degrees between the cover seal and the side surface). The cover seal and side surface of the one or more tonneau sections may form an angle of about 45 degrees or more, about 60 degrees or more, or about 75 degrees or more. The cover seal and side surface of the one or more tonneau sections may form an angle of about 120 degrees or less, about 105 degrees or less, or about 90 degrees or less. The cover seal may be adhered to a surface of the rotary member. The cover seal may be fastened to a surface of the rotary portion. The cover seal may be free of adhesives, fasteners, or both. For example, the cover seal may be co-extruded with a component of the rotary member (e.g., the rotary portion, the engaging portion, or both). Alternatively, the cover seal may be secured in a slot of the rotary member.

The slot functions to secure the cover seal to the rotary member. The slot may be configured to receive a portion of the cover to seal so that the cover seal remains secured to the rotary member. For example, the slot may include one or more flanges to receive one or more complimentary flanges of the cover seal. The slot may include one or more channels to receive the cover seal. The slot may include a "T" shaped channel, a "C" shaped channel, a "U" shaped channel, a "V" shaped channel, a "G" shaped channel, or a combination thereof. The cover seal may be configured so that a width of the cover seal is greater than a width of a channel opening so that the cover seal, once positioned inside the channel of the slot, rests along one or more portions of the channel. The slot may be structurally rigid. For example, the cover seal may be inserted into the slot from a proximal end, a distal end, or both, and moved along a longitudinal axis (i.e., an axis substantially parallel to one or more sidewalls of the cargo box) to a desired location. The slot may be flexible so that an opening of the slot may be expanded to insert the cover seal and retract once the cover seal is positioned inside the slot. The slot may extend away from the slot and be configured to contact one or more surfaces of the one or more tonneau sections. For example, the slot may extend away from the slot at an approximately perpendicular angle relative to the slot. The slot may include one or more flanges to secure the cover seal. The slot may extend along a length of the rotary member or the slot may have a length shorter than a length of the rotary member. The slot may pivot or rotate about the axis of the rotary portion simultaneously with the engaging portion of the rotary member when a lever is contacted by one or more tonneau sections.

The lever functions to rotate the rotary member upon an application of torque to the lever. The lever may be configured to rotate the rotary member from a release position to a locked position, or vice versa. The lever may be directly or indirectly secured to the rotary portion of the rotary member. For example, the lever may be integrally formed with the rotary portion so that, when one or more tonneau sections contact the lever, the lever and the rotary portion simultaneously rotate from a release position to a locked position. The lever may be positioned so that one or more tonneau sections contact the level prior to being placed on the supporting portion of the retainer. For example, the lever and the supporting portion may form an angle of about 45 degrees so that, when one or more tonneau sections are placed onto the supporting portion, the lever is initially contacted and rotated to a position substantially planar with the supporting portion. The lever may be structurally rigid or may be flexible. The lever may be unitarily made with the rotary portion or may be secured to the rotary portion via one or more fasteners, one or more adhesives, or both. The lever may form an angle with the supporting portion of about 15 degrees or more, about 30 degrees or more, or about 45 degrees or more. The lever may form an angle with the supporting portion of about 90 degrees or less, about 75 degrees or less, or about 60 degrees or less. A plurality of levers may be secured to each rotary member. For example, a first lever may be positioned at a first end of the rotary portion and a second lever may be positioned at an opposing second end of the rotary portion so that one or more tonneau sections contact both the first lever and the second lever when placed on the supporting portion of the retainer. A single retainer may rotate one rotary member or a plurality of rotary members. For example, a lever may rotate a first rotary member and a second rotary member abutting opposing sides of the lever. The lever may rotate the rotary member from a release position to a locked position so that a toggle latch may secure the rotary member in the locked position.

The toggle latch functions to secure a position of the rotary member relative to the retainer. The toggle latch may engage a portion of the rotary member to prevent unwanted rotation of the rotary member. For example, one or more teeth of the toggle latch may engage one or more grooves of the rotary portion of the rotary member when the rotary member is in a locked position. A plurality of toggle latches may be configured to engage a single rotary member. For example, each rotary member may be secured in a desired position with one or more toggle latches, two or more toggle latches, or three or more toggle latches. The rotary member may be secured in a desired position with six or less toggle latches, five or less toggle latches, or four or less toggle latches. The toggle latches may be substantially similar or may be different. For example, the plurality of toggle latches may include one or more toggle latches with a tooth, pin, housing, handle, biasing member, flange, or a combination thereof. A plurality of toggle latches may be engaged, released, or both with a common release mechanism. For example, each of the plurality of toggle latches may be attached to a cable release so that a user may pull the cable and release the plurality of toggle latches. The toggle latch may be configured to align with one or more grooves of the rotary member so that the toggle latch may be pivoted to engage the one or more grooves. For example, the toggle latch may include a rotary portion so that the toggle latch may be rotated in an engaging direction (i.e., a direction to engage the rotary member), an opposing direction (i.e., a direction away from the rotary member), or both. The toggle latch may be free of pivoting. For example, the toggle latch may be positioned such that a pin of the toggle latch moves in a substantially linear direction (i.e., the engaging direction, the opposing direction, or both are in a linear direction) to engage and disengage the rotary member. The toggle latch may be mounted to the retainer, a housing that houses a portion of the mounting assembly, or both. The toggle latch may be structurally rigid so that the toggle latch will not accidentally disengage the rotary member. The toggle latch may include one or more flexible portions. For example, the toggle latch may include a flexible pin, one or more teeth, or both to flexibly engage the rotary member. The one or more teeth may be substantially shaped to mate with one or more grooves of the rotary portion.

The tooth functions to engage a groove of the rotary portion to prevent unwanted rotation of the rotary member. The tooth may engage the groove when the rotary member is in a locked position, a release position, a position between the locked position and the release position, or a combination thereof. The tooth may have a complimentary shape of the groove of the rotary portion. For example, the tooth may be substantially triangular to mate with a substantially triangular groove. The tooth may have a size that is less than a size of the groove so that the tooth has a larger tolerance range for engaging the groove. The tooth may be about 25% of the size of the groove or more, or about 50% of the size of the groove or more. The tooth may be about 100% of the size of the groove or less, or about 75% of the size of the groove or less. The tooth may be integrally formed with the toggle latch or may be a secondary component attached to the toggle latch. The tooth may be positioned along a surface of a handle to engage the groove when then toggle latch is pivoted.

The handle functions to provide a user a grasping location to move the handle so that the toggle latch engages the rotary member, disengages the rotary member, or both. The handle may extend from a rotational axis of the toggle latch. For example, the toggle latch may be secured to a housing of the mounting assembly such that the handle pivots about a mounting point of the toggle latch. A user may push or pull the handle to engage one or more teeth of the toggle latch with one or more grooves of the rotary member. Alternatively, a user may push or pull the handle to disengage one or more teeth of the toggle latch with one or more grooves of the rotary member. For example, the toggle latch may include a biasing member that biases the toggle latch in an engaged position so that a user may pull the handle away from the rotary member to disengage the toggle latch. The handle may include one or more abrasive surfaces to increase friction between the handle and a user's hands. The handle may be substantially flat or may include one or more curvatures to increase the grip strength between a user and the handle. The one or more teeth may extend from a surface of the handle. The toggle latch may be free of a handle. For example, the toggle latch may alternatively include a rotary portion and housing configuration such that a handle may not be required.

The rotary portion of the toggle latch functions to rotate a tooth so that the tooth engages a groove of the rotary portion to prevent unwanted rotation of the rotary member. The rotary portion may be configured to connect to a part of the retainer (e.g., the receiving portion, the supporting portion, the contoured projection, the mounting portion, or a combination thereof), a housing, or both. The rotary portion may be configured to rotate in an engaging direction (i.e. towards the groove of the rotary member, an opposing direction (i.e., away from the groove of the rotary member), or both.

The rotary portion may include one or more receiving features (e.g., holes, slots, latches, hooks, etc.) to receive a cable. For example, a plurality of toggle latches may be positioned along the mounting assembly so that one cable is connected to a plurality of toggle latches via the receiving features. The cable may then be configured so that a user may pull the cable in a release direction (i.e., a direction opposing the engaging direction) so that the toggle latches disengage from the grooves of the rotary member simultaneously. Alternatively, each rotary portion may be attached to a single cable extending through a casing configured to protect a portion of the exposed wire. The casing may be mounted to the retainer, a housing of the mounting assembly, or both. For example, the casing may be secured in a slot of the retainer having one or more lips.

The rotary portion may be adapted to rotate about an axis of the rotary portion. The rotary portion may be adapted to rotate about 30 degrees or more, about 60 degrees or more, or about 90 degrees or more. The rotary portion may be adapted to rotate about 180 degrees or less, about 150 degrees or less, or about 120 degrees or less. The rotary portion may be substantially circular, square, rectangular, oval, trapezoidal, or a combination thereof. The rotary portion may be structurally rigid or may be flexible. The rotary portion may include one or more biasing members. The rotary portion may be positioned within a toggle latch housing.

The toggle latch housing functions to secure the toggle latch to the retainer, housing of the mounting assembly, or both. The housing functions to align the pin of the toggle latch with one or more grooves of the rotary member. The housing may include a channel for the pin so that the pin travels in a desired direction to engage the rotary member. The pin may travel along one or more surfaces of the channel in a desired direction. For example, the housing may include a channel to receive the pin so that the pin travels in a substantially linear direction to engage and disengage the rotary member. The housing may house the pin. The housing may include one or more biasing members to bias the pin in an engaged direction, an opposing direction, or both. The housing may include one or more mounting features configured to secure the housing to the retainer, housing of the mounting assembly, or both. For example, the housing may include one or more flanges that may be configured to rest along one or more lips of the retainer to secure the toggle latch to the retainer. The mounting features may be one or more protrusions, extensions, recesses, or a combination thereof. The housing may be secured to the retainer, the housing of the mounting assembly, or both using one or more fasteners, one or more adhesives, or both. The rotary member, retainer, toggle latch, or a combination thereof may be located within a housing of the mounting assembly.

The housing functions to protect and house one or more components of the mounting assembly. The housing may house a portion of the rotary member, retainer, toggle latch, or a combination thereof. For example, the housing may be mounted to an end portion of the retainer, and be configured to expose a portion of the rotary member, retainer, or both, yet protect the rotary portion of the rotary member. The housing may be configured to allow rotation of the rotary member between a locked position and a release position, or vice versa. The housing may be mounted to the rotary member, retainer, toggle latch, or a combination thereof. For example, the housing may include one or more holes so that one or more fasteners may be inserted into the holes and secured to the rotary member, retainer, toggle latch, or a combination thereof. The housing may be mounted to the rotary member, retainer, toggle latch, or a combination thereof using one or more fasteners, one or more adhesives, or both. The housing may include one or more mechanically engaging features to secure the housing. For example, the housing may include one or more clips, teeth, lips, flanges, protrusions, clamps, latches, hooks, arms, or a combination thereof to secure the housing to the rotary member, retainer, toggle latch, or a combination thereof. The housing may be configured to prevent unwanted moisture, debris, or other items from entering the interior portions of the mounting assembly. The housing may be positioned on the mounting assembly near a proximal end or distal end of the mounting assembly relative to the passenger cabin of the vehicle. The housing may be structurally rigid to prevent puncturing or fracturing of the housing. Alternatively, the housing may be flexible to form to one or more contoured surfaces of the mounting assembly when secured to the mounting assembly. A plurality of housings may be mounted to a single mounting assembly. For example, a first housing and a second housing may abut opposing end portions of the retainer of the mounting assembly.

Turning now to the figures, FIG. 1 illustrates a perspective view of a pickup truck 100 having a tonneau system 12 that is a foldable tonneau system 12A. The pickup truck 100 includes a cargo box 102 and a passenger cabin 104. The cargo box 102 includes a front wall (not shown), a left sidewall 108, a right sidewall 110, and a rear wall or tailgate 112. The left sidewall 108 and the right sidewall 110 of the pickup truck 100 are symmetrically opposite to each other. The foldable tonneau system 12A includes a cover 14 with a plurality of tonneau sections 16. The foldable tonneau system 12A includes a front tonneau section 16a, middle tonneau section 16b, and rear tonneau section 16n. While only three tonneau sections 16 are shown, it should be noted that the foldable tonneau system 12A is adapted to include more or less than three tonneau sections 16. Each of the plurality of tonneau sections 16a-16n includes cross bow members 28 extended between, and connected to, opposing side members 22. The cover 14 is connected to each of the cross bow members 28 by a cover attachment assembly (not shown). The tonneau system 12 is secured to the cargo box 102 by a plurality of mounting assemblies (see FIGS. 4-7) secured to the side members 28.

Figure 2:
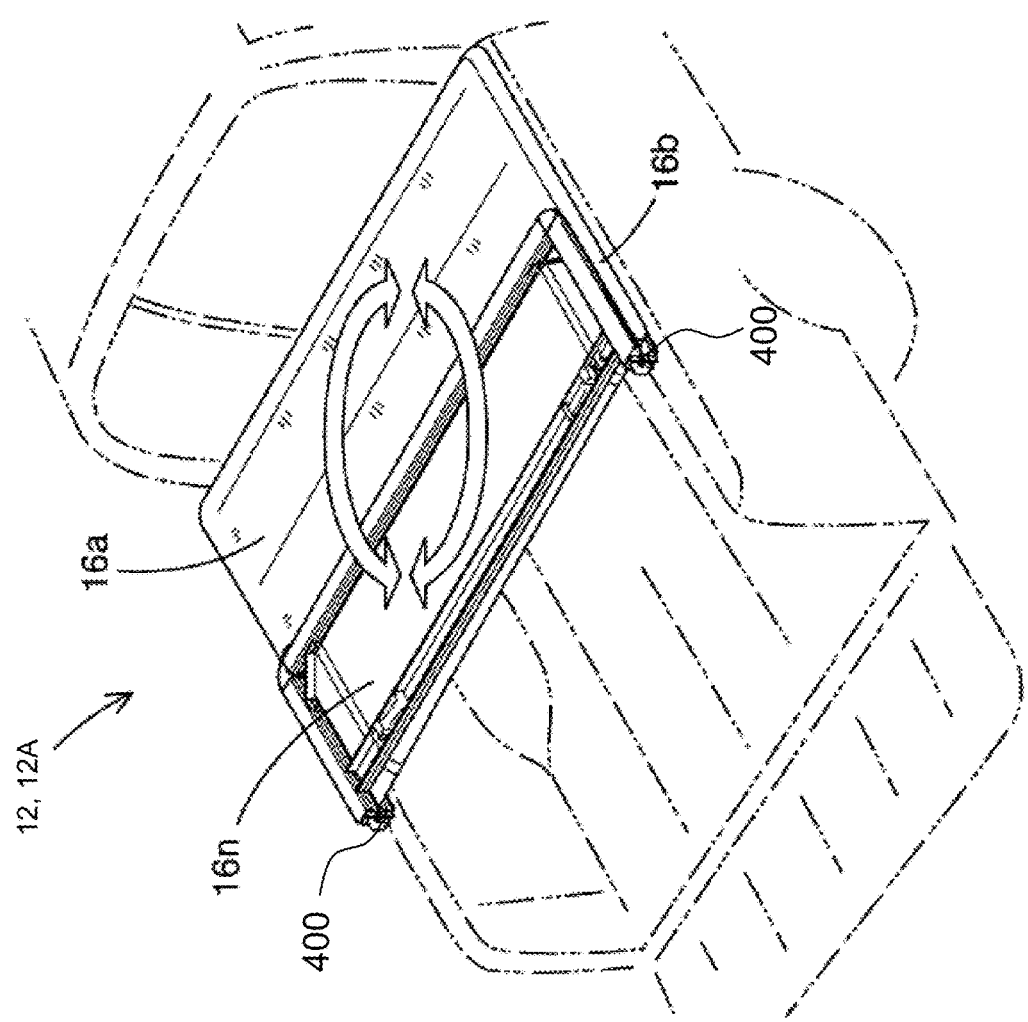
FIG. 2 is a perspective view of a foldable tonneau cover with a rear tonneau section folded upon a middle tonneau section.

FIG. 2 illustrates a perspective view of a tonneau system 12 that is a foldable tonneau system 12A, with a rear tonneau section 16n folded upon a middle tonneau section 16b using a pair of dual linkage hinge assemblies 400 attached on each side of the foldable tonneau system 12A. The rear tonneau section 16n and the middle tonneau section 16b together can be folded onto a front tonneau section 16a using an additional pair of dual linkage hinge assemblies (not shown).

Figure 3:
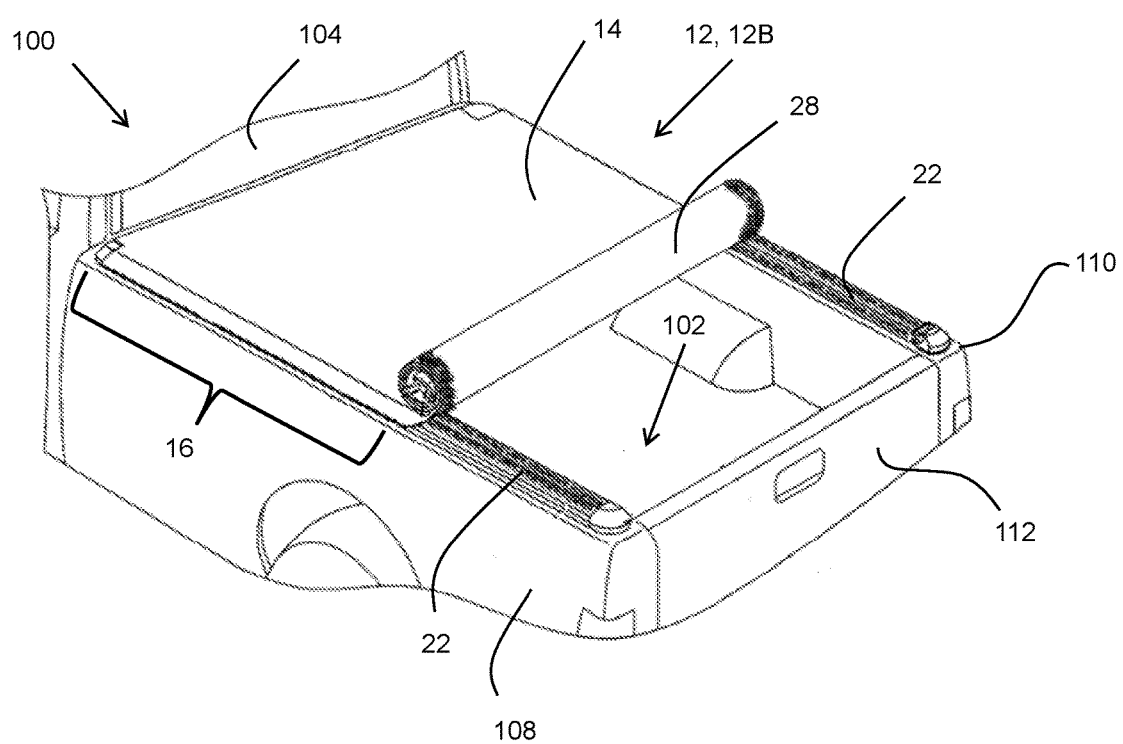
FIG. 3 is a perspective view of a rollable tonneau cover positioned upon a cargo box of a pickup truck.

FIG. 3 illustrates a perspective view of a pickup truck 100 having a tonneau system 12 that is a rollable tonneau system 12B. The rollable tonneau system 12B includes a continuous rollable tonneau section 16. The pickup truck 100 includes a cargo box 102 and a passenger cabin 104. The cargo box includes a front wall (not shown), a left sidewall 108, a right sidewall 110, and a rear wall or tailgate 112. The left sidewall 108 and the right sidewall 110 of the pickup truck 100 are symmetrically opposite to each other. The rollable tonneau system 12B includes a cover 14. The cover includes a plurality of interlinked foldable cross bow members 28 extended between, and connected to, opposing side members 22. The cover is connected to each of the cross bow members 28 by a cover attachment assembly (not shown) to create a continuous rollable tonneau system 12B. The tonneau system 12 is secured to the cargo box 102 by a plurality of mounting assemblies (see FIGS. 4-7) secured to the left sidewall 108 and the right sidewall 110.

Figure 4:
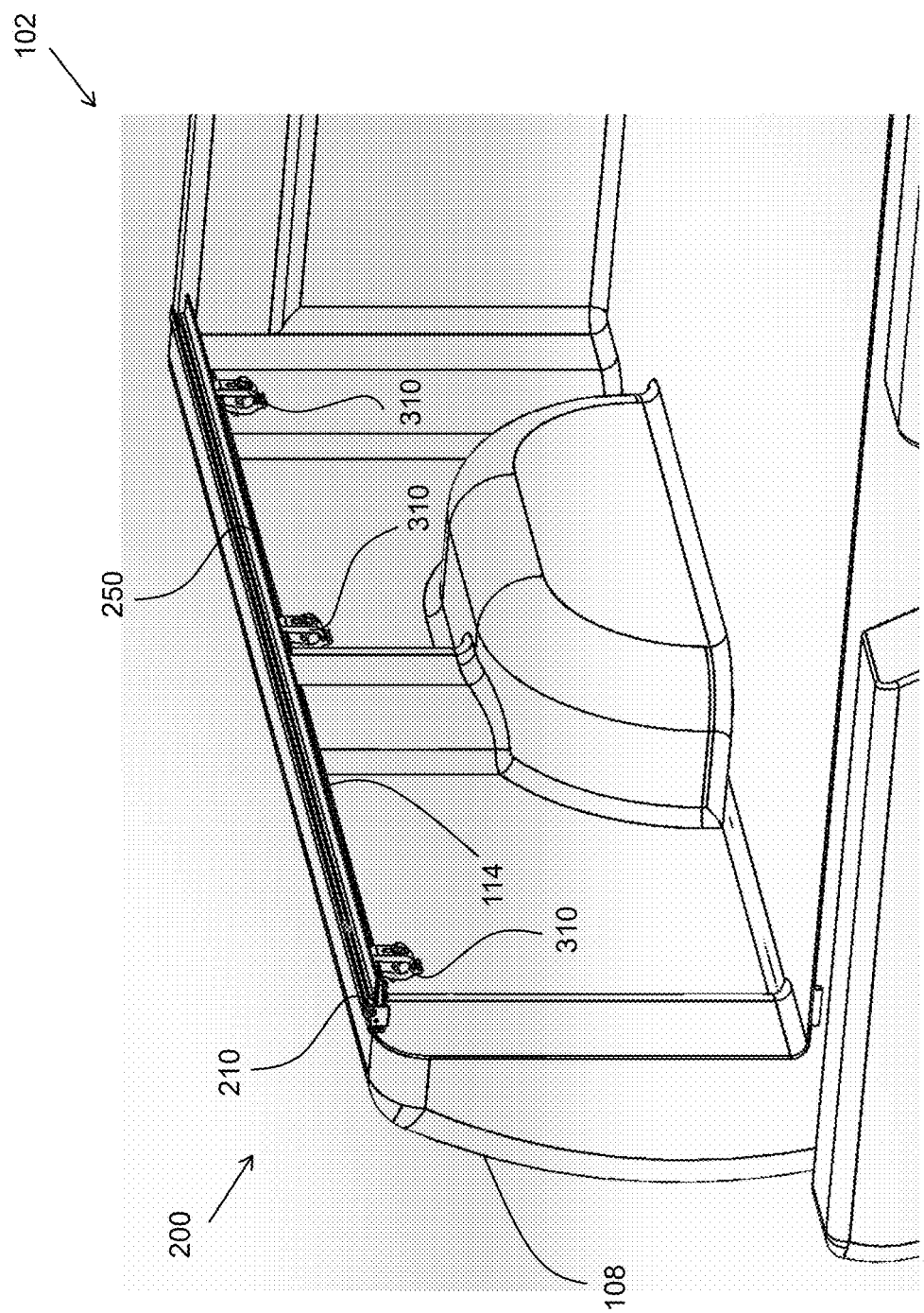
FIG. 4 is a perspective view of a mounting assembly secured to a sidewall of a cargo box.

FIG. 4 illustrates a perspective view of a mounting assembly 200 secured to a sidewall of a cargo box 102 of a vehicle. A retainer 250 of the mounting assembly 200 abuts one or more surfaces of a left sidewall 108 so that the retainer 250 can be secured to a vertical lip 114 of the sidewall via a plurality of clamps 310. A rotary member 210 rotatably engages the retainer 250 so that one or more tonneau sections can be secured between the rotary member 210 and the retainer 250 (see FIG. 6). One or more additional mounting assemblies 200 may be secured to the right sidewall of the cargo box, a tailgate of the cargo box (not shown), or both to secure one or more tonneau sections to the cargo box (see FIGS. 1 and 6). It should be noted that the mounting assemblies 200 may only require an initial installation such that the one or more tonneau sections can be installed or removed from the cargo box without installing or uninstalling the mounting assemblies 200 each time (see FIGS. 6 and 7).

Figure 5:
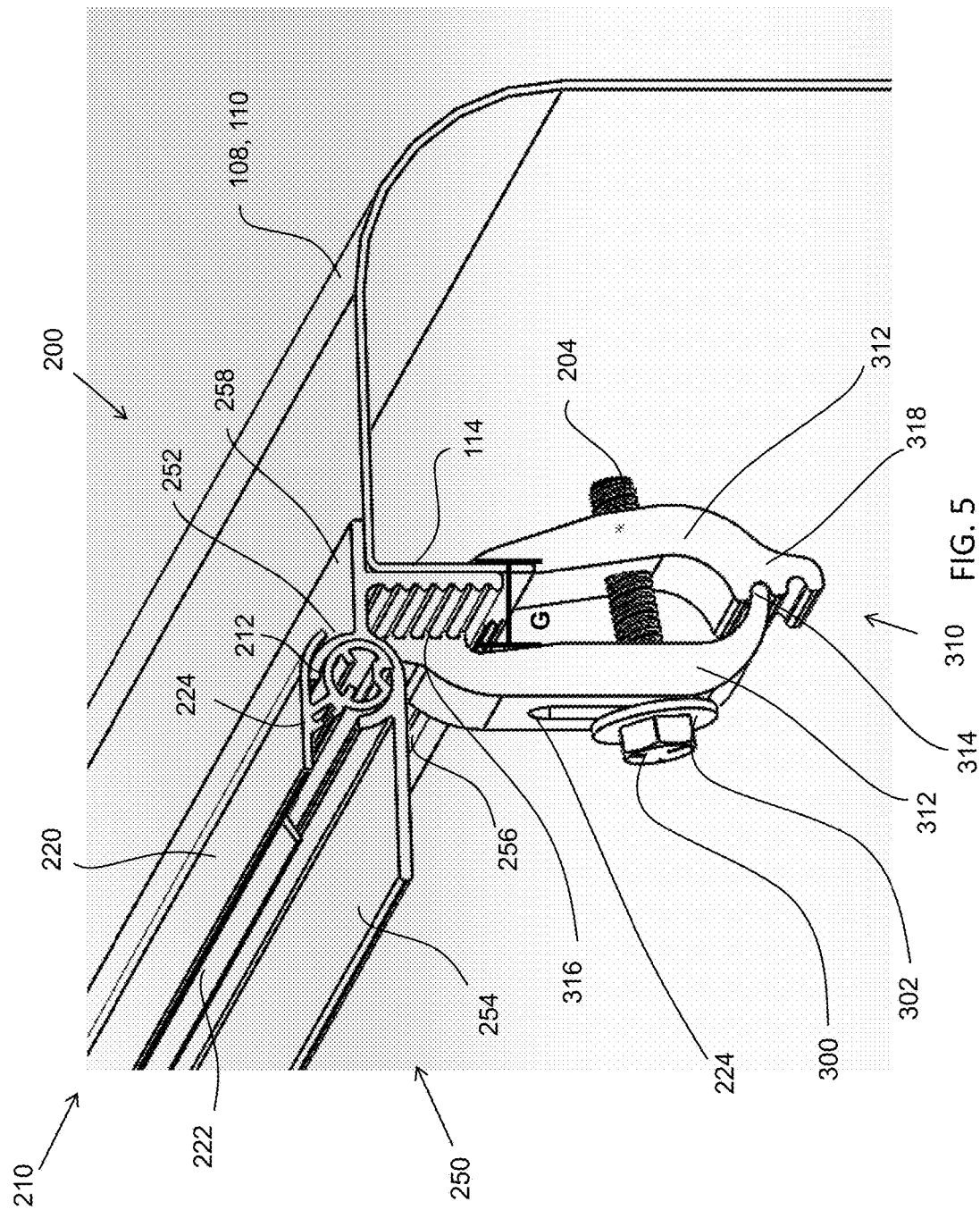
FIG. 5 is a cross-sectional view of a mounting assembly secured to a sidewall of a cargo box.
Figure 6:
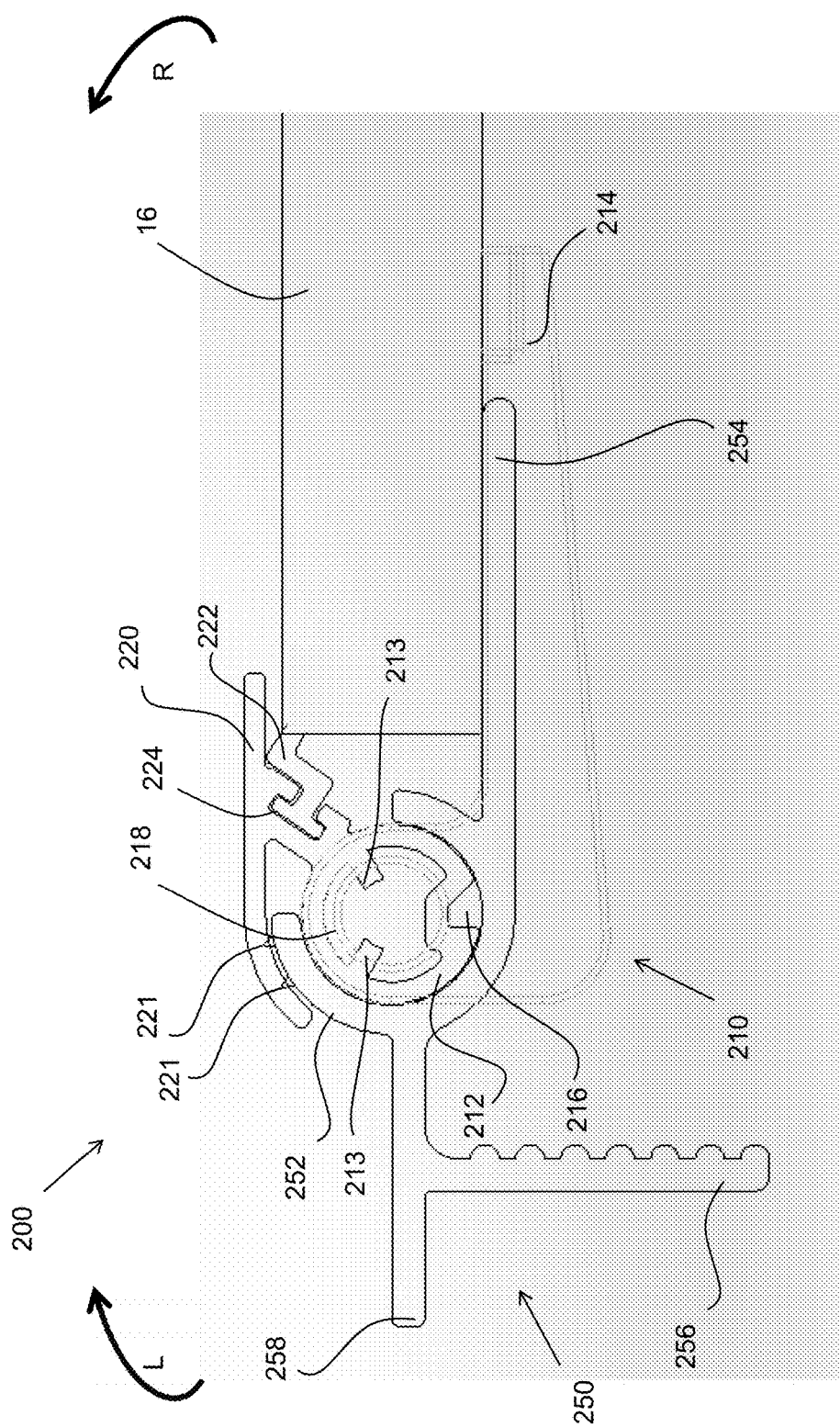
FIG. 6 is a cross-sectional view of a mounting assembly secured to a tonneau section in a locked position.

FIG. 5 illustrates a cross-sectional view of a mounting assembly 200 in a locked position secured to sidewall of a cargo box. The mounting assembly 200 includes a rotary member 210 and a retainer 250, the rotary member 210 engaged to a receiving portion 252 of the retainer 250. During installation, a tonneau section is placed on, and supported by, a supporting portion 254 of the retainer 250 (as shown in FIG. 6). During installation or removal of a tonneau section, a lever of the rotary member 210 is engaged, resulting in a rotary portion 212 being rotated (see FIG. 6). An engaging portion 220 of the rotary member 210 is adapted to abut a top surface of the tonneau section. The rotary member 210 further includes a cover seal 222 secured in a slot 224 of the rotary member 210, the cover seal 222 adapted to compressibly contact the tonneau section to create a seal to prevent moisture, debris, or both from entering an interior portion of the mounting assembly 200. To secure the mounting assembly 200 to the left sidewall 108 or right sidewall 110, a substantially flat surface of a contoured projection 256 of the retainer 250 abuts a vertical lip 114 of the sidewall (108, 110). Once abutted, a clamp 310 secures the contoured projection 256 to the vertical lip 114 by a plurality of arms 312. A first arm 312A having a plurality of grooves 316 mates to a contoured surface of the contoured projection 256, and a second arm 312B mates to the substantially flat surface to secure the contoured projection 256 and the vertical lip 114 in a gap (G) between the first arm 312A and the second arm 312B. An end portion 314 of the first arm 312A is received by a projection portion 318 of the second arm 312B, such that a fastener 300 having a washer 302 is inserted into a slot 224 and a hole 204 of the arms 312 to create the clamping force. When the mounting assembly 200 is installed, a mounting portion 258 of the retainer 250 rests along a top surface of the sidewall (108, 110) to maintain the position of the mounting assembly 200.

Figure 7:
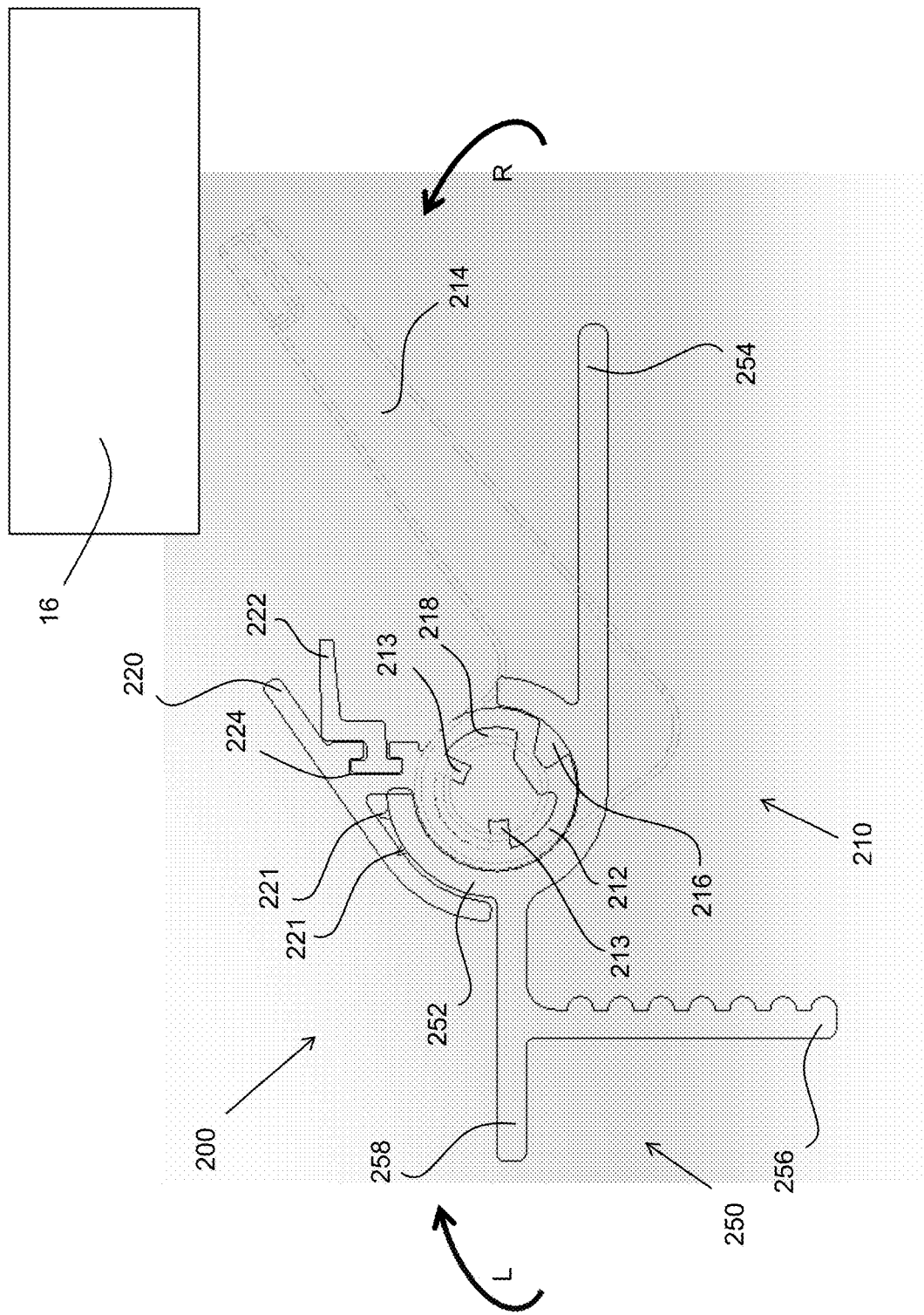
FIG. 7 is a cross-sectional view of a mounting assembly in a release position.
Figure 8:
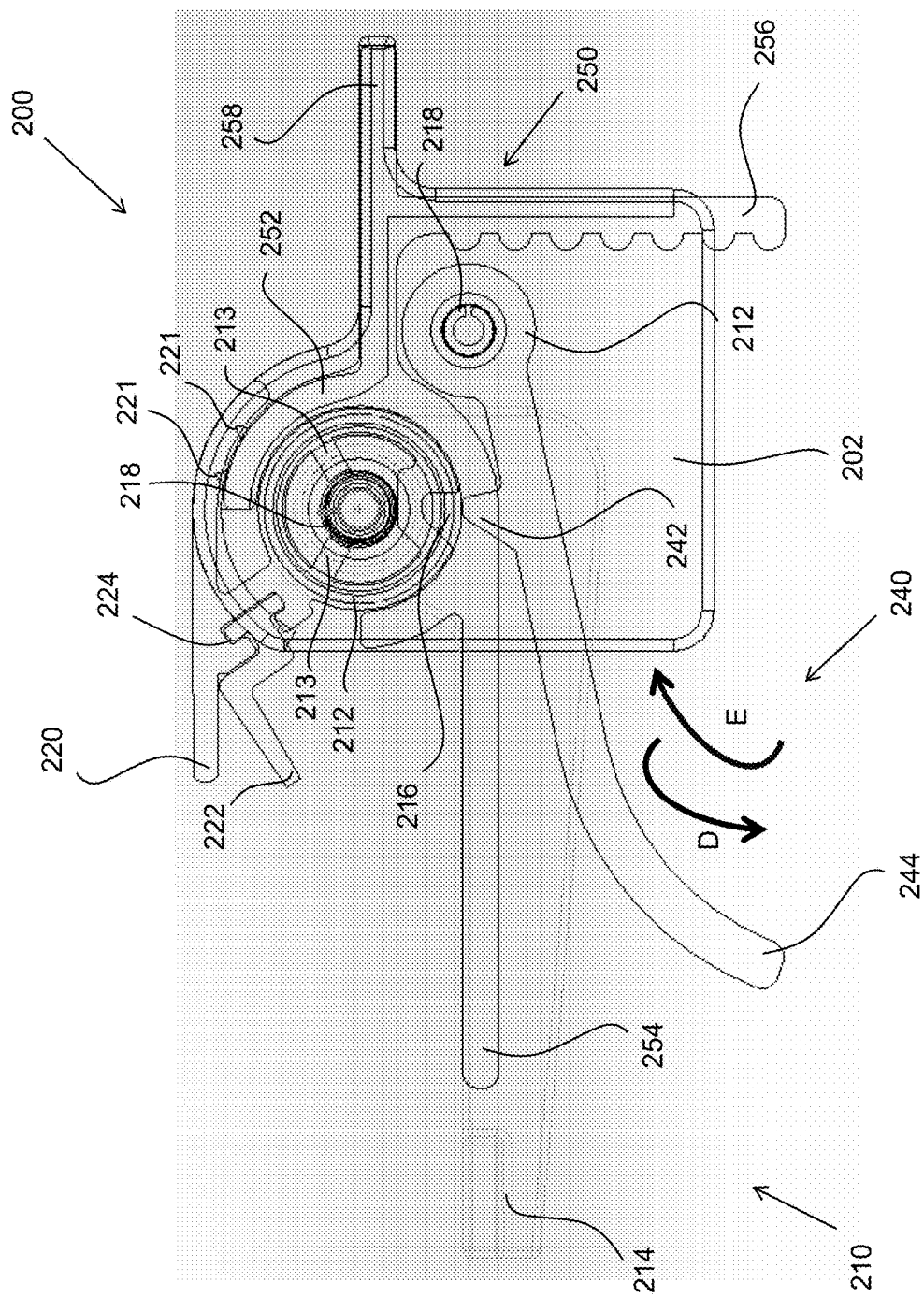
FIG. 8 is a cross-sectional view of a mounting assembly disengaged from a toggle latch.
Figure 9:
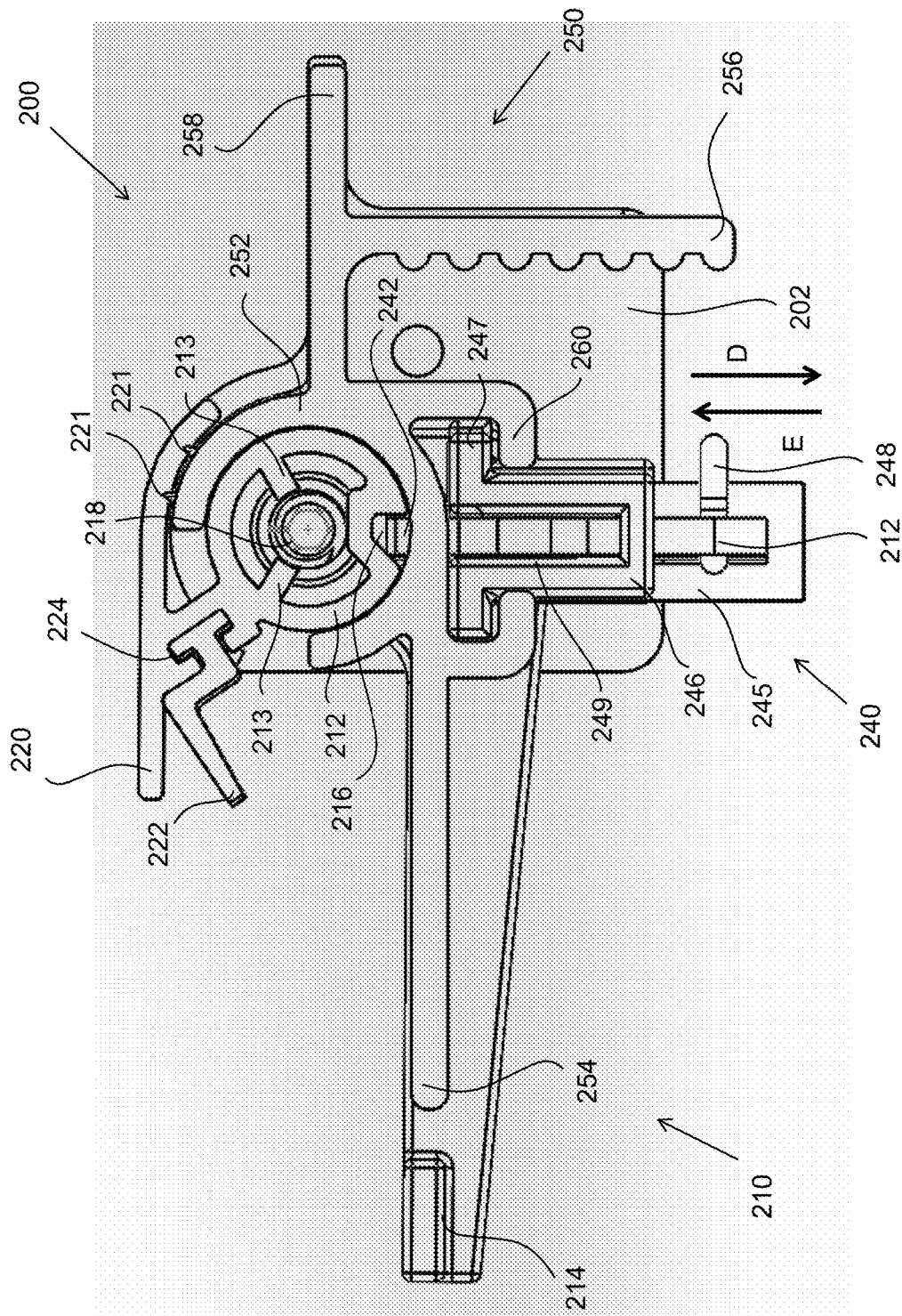
FIG. 9 is a cross-sectional view of a mounting assembly engaged with a toggle latch.

FIGS. 6 and 7 illustrate cross-sectional views of a mounting assembly 200 securing and releasing a tonneau section 16 of a tonneau system. The mounting assembly 200 includes a rotary member 210 rotatably engaged to a receiving portion 252 of a retainer 250. The tonneau section 16 is placed on, and supported by, a supporting portion 254 of the retainer 250. During the placement of the tonneau section 16 (i.e., during installation as shown in FIG. 6), a lever 214 of the rotary member 210 is engaged, resulting in a rotary portion 212 being rotated in a locking direction (L) towards the tonneau section 16. When the rotary portion 212 is rotated in the locking direction (L), an engaging portion 220 abuts a top surface of the tonneau section 16, and a cover seal 222 secured in a slot 224 of the rotary member 210 compressibly contacts the tonneau section 16 to create a seal to prevent moisture, debris, or both from entering an interior portion of the mounting assembly 200. The rotary member 210 further includes a plurality of rotary seals 221 to seal a gap between the rotary member 210 and the receiving portion 252. When the tonneau section 16 disengages the mounting assembly 200 (i.e., the tonneau section 16 is uninstalled as shown in FIG. 7), the lever 214 is released and the rotary portion 212 rotates in a release direction (R) due to a biasing member 218 secured to a plurality of projections 213 extending from an interior surface of the rotary portion 212. The rotary portion 212 further includes a groove 216 to receive a toggle latch adapted to lock the mounting assembly 200 in a locked position (as shown in FIGS. 8 and 9). The toggle latch and the rotary portion 212 are partially housed within a housing secured to a contoured projection 256 of the retainer 250 via a plurality of bumps (see FIGS. 8 and 9). The mounting assembly 200 is secured to one or more side rails by abutting a mounting portion 258 of the retainer 250 to a surface of the side rails and clamping the contoured projection 256 of the retainer 250 to a vertical lip of the side rails and (see FIGS. 4 and 5).

FIGS. 8 and 9 illustrate cross-sectional views of a mounting assembly 200 having a toggle latch 240. The mounting assembly 200 includes a rotary member 210 rotatably engaged to a receiving portion 252 of a retainer 250. During installation, a tonneau section is placed on, and supported by, a supporting portion 254 of the retainer 250 (as shown in FIG. 6). During installation or removal of the tonneau section, a lever 214 of the rotary member 210 is engaged, resulting in a rotary portion 212 being rotated (see FIG. 6). An engaging portion 220 of the rotary member 210 is adapted to abut a top surface of the tonneau section. The rotary member 210 further includes a cover seal 222 secured in a slot 224 of the rotary member 210, the cover seal 222 adapted to compressibly contact the tonneau section to create a seal to prevent moisture, debris, or both from entering an interior portion of the mounting assembly 200. In addition to the cover seal 222, the rotary member 210 includes a plurality of rotary seals 221 to seal a gap between the rotary member 210 and the receiving portion 252. A portion of the rotary member 210 and the retainer 250 are located within an exterior housing 202 secured to a contoured projection 256 of the retainer 250 via a plurality of bumps. When a tonneau section is not present, the rotary member 210 remains in a release position due to a biasing member 218 secured to a plurality of projections 213 extending from an interior surface of the rotary portion 212 (see FIG. 7). The mounting assembly 200 is secured to one or more side rails by abutting a mounting portion 258 of the retainer 250 to a surface of the side rails and clamping the contoured projection 256 of the retainer 250 to a vertical lip of the side rails and (see FIGS. 4 and 5).

As shown in FIG. 8, to secure the rotary member 210 in a locked position, a user positions a groove 216 of a rotary portion 212 in line with a tooth 242 of the toggle latch 240 so that a biasing member 218 within the toggle latch 240 biases the tooth 242 in an engaging direction (E) into the groove 216. The toggle latch 240 is adapted to engage the rotary member 210 during installation of a tonneau section, when the mounting assembly 200 is free of a tonneau section, or both. To disengage the toggle latch 240 from the rotary member 210, a handle 244 is moved in an opposing direction (D) to release the tooth 242 from the groove 216.

An alternative toggle latch 240 is shown in FIG. 9. The toggle latch 240 includes a housing 246 and a rotary portion 212, the rotary portion 212 being located within a channel 249 of the housing. A flange 247 of the housing 246 is received by a lip 260 of the retainer 250 so that a tooth 242 of the toggle latch 240 is positioned beneath a groove 216 of the rotary portion 212 of the rotary member 210. To secure the rotary member 210 in a locked position, a user positions the groove 216 in line with the tooth 242 so that a biasing member within the toggle latch (not shown) biases the tooth 242 in an engaging direction (E) into the groove 216. The toggle latch 240 is adapted to engage the rotary member 210 during installation of a tonneau section, when the mounting assembly 200 is free of a tonneau section, or both. To disengage the toggle latch 240 from the rotary member 210, a cable 248 connected to the rotary portion 212 of the toggle latch 240 is moved in an opposing direction (D) to release the tooth 242 from the groove 216. The cable 248 may extend through a casing 245 and be secured on opposing ends to complimentary toggle latches 240 so that, when the cable 248 is pulled in the opposing direction (D), the complimentary toggle latches 240 are simultaneously released (see FIG. 11).

Figure 10:
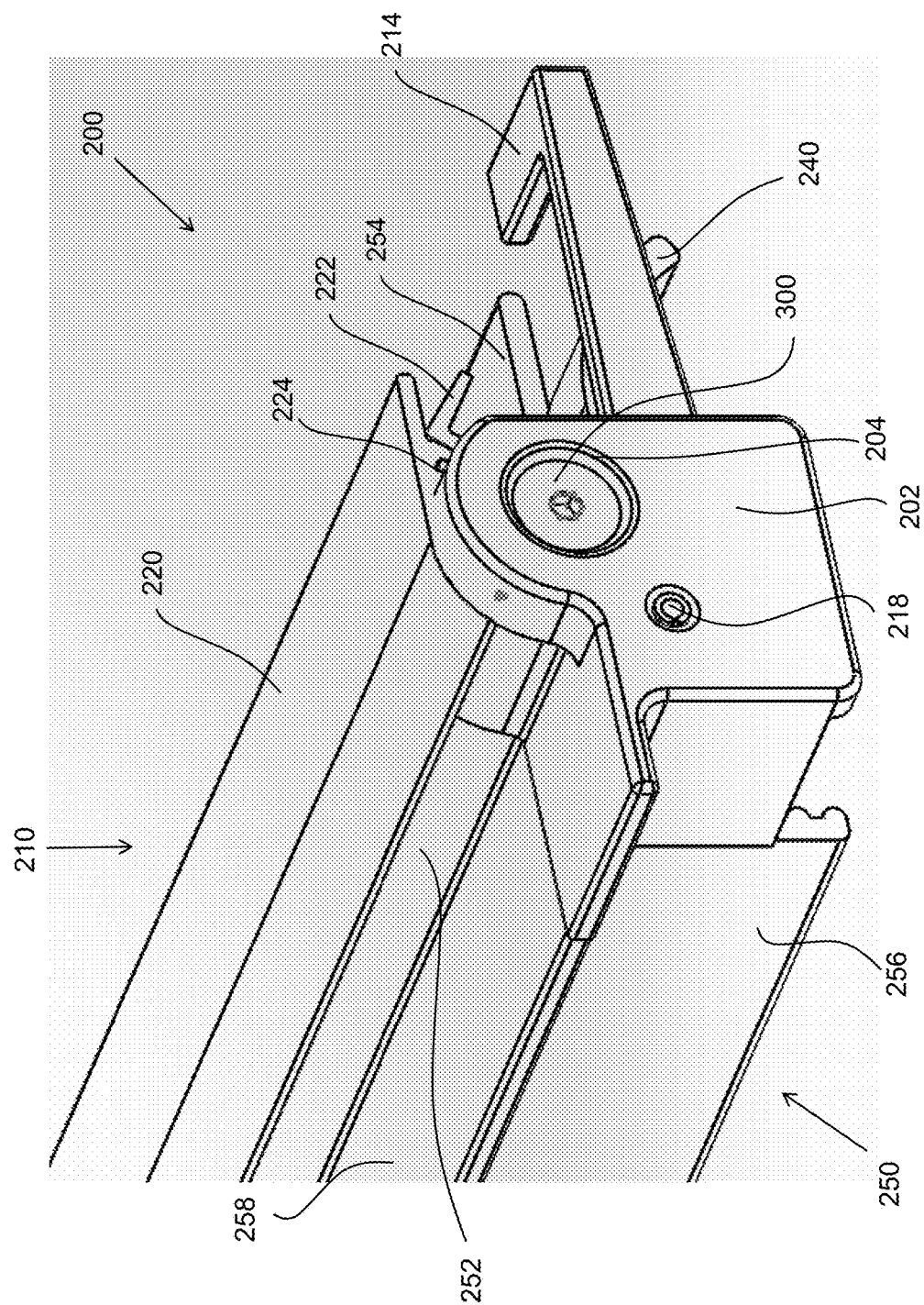
FIG. 10 is a perspective view of a mounting assembly in a locked position.

FIG. 10 illustrates a perspective view of a mounting assembly 200 in a locked position. The mounting assembly 200 includes a rotary member 210 and a retainer 250, the rotary member 210 engaged to a receiving portion 252 of the retainer. A housing 202 mounted to a contoured projection 256 of the retainer 250 via a plurality of bumps contains a rotary portion of the rotary member 210 (as shown in FIG. 8). A fastener 300 located within a hole 204 of the housing 202 secures the rotary portion so that, when a lever 214 of the rotary member 210 is engaged by a tonneau section placed on a supporting portion 254 of the retainer 250, the rotary portion rotates. When the rotary portion rotates, an engaging portion 220 of the rotary member 210 abuts a top surface of the tonneau section. Additionally, a cover seal 222 secured in a slot 224 of the rotary member 210 compressibly contacts the tonneau section to create a seal to prevent moisture, debris, or both from entering an interior portion of the mounting assembly (see FIG. 6). To maintain the locked position as shown, a toggle latch 240 is pivoted with the aid of a biasing member 218 so that a tooth of the toggle latch 240 engages a groove of the rotary member, preventing unwanted rotation of the rotary member 210 (as shown in FIG. 8). The mounting assembly 200 is secured to one or more side rails by abutting a mounting portion 258 of the retainer 250 to a surface of the side rails and clamping the contoured projection 256 of the retainer 250 to a vertical lip of the side rails and (see FIGS. 4 and 5).

Figure 11:
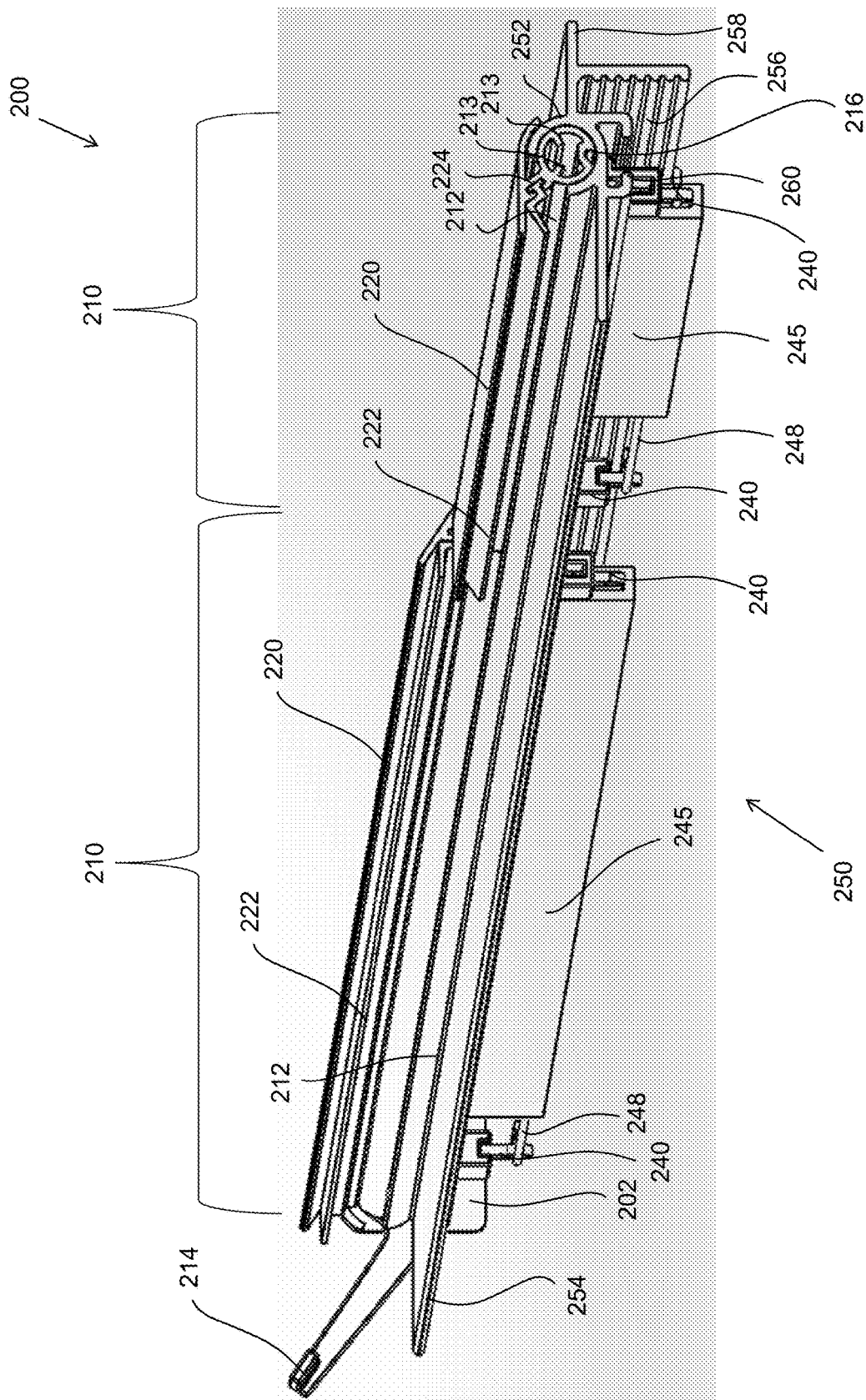
FIG. 11 is a perspective view of a mounting assembly having a plurality of rotary members.

FIG. 11 illustrates a perspective view of a mounting assembly 200. The mounting assembly 200 includes a plurality of rotary members 210 and a retainer 250, the rotary members 210 engaged to a receiving portion 252 of the retainer. During installation, a tonneau section is placed on, and supported by, a supporting portion 254 of the retainer 250 (as shown in FIG. 6). During installation or removal of a tonneau section from a desired rotary member 210, a lever 214 of the rotary member 210 is engaged, resulting in a rotary portion 212 being rotated (see FIG. 6). An engaging portion 220 of the rotary members 210 is adapted to abut a top surface of the tonneau section. Each rotary member 210 further includes a cover seal 222 secured in a slot 224 of the rotary member 210, the cover seal 222 adapted to compressibly contact the tonneau section to create a seal to prevent moisture, debris, or both from entering an interior portion of the mounting assembly 200. A portion of the rotary member 210 and the retainer 250 are located within an exterior housing 202 secured to a contoured projection 256 of the retainer 250 via a plurality of bumps. When a tonneau section is not present, the rotary member 210 remains in a release position due to a biasing member secured to a plurality of projections 213 extending from an interior surface of the rotary portion 212 (see FIG. 7). A plurality of toggle latches 240 are received by a lip 260 of the retainer 250 so that the toggle latches 240 are positioned beneath a groove 216 of the rotary portions 212. The toggle latches 240 are adapted to engage the groove 216 and secure the rotary portions 212 in a locked position (see FIGS. 8 and 9). To release the toggle latches 240 from the rotary portions 212, a cable 248 extending through a casing 245 and secured to the plurality of toggle latches 240 of each rotary portion 212 is pulled, simultaneously release the toggle latches 240. The mounting assembly 200 is secured to one or more side rails by abutting a mounting portion 258 of the retainer 250 to a surface of the side rails and clamping the contoured projection 256 of the retainer 250 to a vertical lip of the side rails (see FIGS. 4 and 5).

FIG. 12 illustrates a cross-sectional view of a mounting assembly 200 securing a tonneau section 16 of a tonneau system. The mounting assembly 200 includes a rotary member 210 rotatably engaged to a receiving portion 252 of a retainer 250. The tonneau section 16 is placed on, and supported by, a supporting portion 254 of the retainer 250. During the placement of the tonneau section 16, a lever of the rotary member 210 is engaged, resulting in a rotary portion 212 being rotated in a locking direction (L) towards the tonneau section 16. When the rotary portion 212 is rotated in the locking direction (L), an engaging portion 220 abuts a top surface of the tonneau section 16, and a cover seal 222 integrally formed with the rotary member 210 compressibly contacts the tonneau section 16 to create a seal to prevent moisture, debris, or both from entering an interior portion of the mounting assembly 200. The rotary member 210 further includes a plurality of rotary seals 221 to seal a gap between the rotary member 210 and the receiving portion 252. When the tonneau section 16 disengages the mounting assembly 200 (i.e., the tonneau section 16 is uninstalled), the lever is released and the rotary portion 212 rotates in a release direction (R) due to a biasing member secured to a plurality of projections 213 extending from an interior surface of the rotary portion 212 (see FIG. 7). The rotary portion 212 further includes a groove 216 to receive a toggle latch adapted to lock the mounting assembly 200 in a locked position (as shown in FIGS. 8 and 9). The toggle latch and the rotary portion 212 are partially housed within a housing secured to a contoured projection 256 of the retainer 250 via a plurality of bumps (see FIGS. 8 and 9). The mounting assembly 200 is secured to one or more side rails by abutting a mounting portion 258 of the retainer 250 to a surface of the side rails and clamping the contoured projection 256 of the retainer 250 to a vertical lip of the side rails and (see FIGS. 4 and 5).

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A mounting assembly comprising:
   I. a retainer connected to one or more side rails of a cargo box of a vehicle, the retainer having:
      i. a receiving portion having an axis; and
      ii. a supporting portion extending away from the receiving portion and positioned substantially perpendicular to the axis of the receiving portion; and
   II. a rotary member having:
      i. a rotary portion rotatably engaged to the receiving portion to rotate about the axis of the receiving portion; and
      ii. a cover seal connected to the rotary member, the cover seal configured to compressibly engage a tonneau section to create a seal between the rotary member and the tonneau section;
   wherein, when a surface of the tonneau section is positioned on the supporting portion, the rotary member is rotated so that the cover seal compressibly engages the tonneau section and an engaging portion of the rotary member abuts an opposing surface of the tonneau section to secure the tonneau section between the engaging portion and the receiving portion.

2. The mounting assembly according to claim 1, wherein the rotary member returns to a release position by a biasing member located within the rotary portion of the rotary member when the tonneau section is removed.

3. The mounting assembly according to claim 1, wherein the rotary member further comprises a plurality of rotary seals to seal a gap between the rotary member and the retainer.

4. The mounting assembly according to claim 1, wherein a biasing member is secured within the rotary portion by a plurality of projections projecting inwardly from an interior surface of the rotary portion towards the axis of the receiving portion.

5. The mounting assembly according to claim 1, further comprising:
   I. a toggle latch located adjacent to the rotary member, the toggle latch having:
      i. a rotary portion; and
      ii. a tooth;
   wherein the toggle latch is rotated about an axis of the rotary portion of the toggle latch towards a groove of the rotary member so that the tooth engages the groove and prevents unwanted rotation of the rotary member.

6. The mounting assembly according to claim 1, further comprising:
   I. a toggle latch located adjacent to the rotary member, the toggle latch having:
      i. a housing; and
      ii. a rotary portion located within a channel of the housing;
   wherein the rotary portion of the toggle latch is biased towards a groove of the rotary member so that the rotary portion of the toggle latch engages the groove and prevents unwanted rotation of the rotary member.

7. The mounting assembly according to claim 5, wherein the toggle latch is configured to prevent rotation of the rotary member when the tonneau section is secured in the mounting assembly.

8. The mounting assembly according to claim 5, wherein the toggle latch is configured to prevent rotation of the rotary member when the mounting assembly is free of the tonneau section.

9. The mounting assembly according to claim 5, wherein the rotary portion of the toggle latch further includes a biasing member to bias the tooth towards the groove of the rotary member.

10. The mounting assembly according to claim 1, wherein the rotary member further comprises a lever extending away from the rotary portion and positioned substantially perpendicular to the axis of the receiving portion, and the lever abuts the receiving portion so that the tonneau section initiates contact with the lever to engage rotation of the rotary member prior to the surface of the tonneau section reaching the receiving portion.

11. A tonneau system comprising: one or more mounting assemblies of claim 1, wherein the tonneau system includes a plurality of tonneau sections configured to fold onto one another.

12. The tonneau system according to claim 11, wherein the one or more mounting assemblies are configured to receive the plurality of tonneau sections in a folded state.

13. A tonneau system comprising: one or more mounting assemblies of claim 1, wherein the tonneau system includes a rolling cover configured to roll onto itself.

14. The mounting assembly according to claim 1, wherein the rotary portion of the rotary member is covered by a housing.

15. The mounting assembly according to claim 1, further comprising:
   i. one or more clamps having a plurality of arms, the plurality of arms pivotally engaged to one another to create a gap between the plurality of arms,
   wherein a contoured projection of the retainer extending away from the receiving portion abuts a vertical lip of the cargo box, and the contoured projection and the vertical lip are clamped within the gap of the one or more clamps.

16. The mounting assembly according to claim 1, wherein the rotary member is configured to rotate between a release position and a locked position.

17. The mounting assembly according to claim 1, wherein a plurality of mounting assemblies located on opposing side rails of the cargo box secures the tonneau section to the cargo box.

18. The mounting assembly according to claim 10, wherein the lever of the rotary member and the receiving portion of the retainer are coplanar when the tonneau section is resting on the supporting portion.

19. A mounting assembly comprising:
   I. a retainer connected to one or more side rails of a cargo box of a vehicle, the retainer having:
      i. a receiving portion having an axis; and ii. a supporting portion extending away from the receiving portion and positioned substantially perpendicular to the axis of the receiving portion;
II. a rotary member having:
 i. a rotary portion rotatably engaged to the receiving portion to rotate about the axis of the receiving portion;
 ii. a lever extending away from the rotary portion and positioned substantially perpendicular to the axis of the receiving portion; and
 iii. a cover seal connected to the rotary member, the cover seal configured to compressibly engage a tonneau section to create a seal between the rotary member and the tonneau section; and
III. a toggle latch located adjacent to the rotary member, the toggle latch having:
 i. a rotary portion; and
 ii. a tooth;
wherein, when a surface of the tonneau section is positioned on the supporting portion, the lever is engaged to rotate the rotary member so that the cover seal compressibly engages the tonneau section and an engaging portion of the rotary member abuts an opposing surface of the tonneau section to secure the tonneau section between the engaging portion and the receiving portion; and
wherein the toggle latch is rotated about an axis of the rotary portion of the toggle latch towards a groove of the rotary portion so that the tooth engages the groove and prevents unwanted rotation of the rotary member.

20. A method, comprising:
I. attaching one or more mounting assemblies of claim 1 to the cargo box of the vehicle;
II. inserting the tonneau section into the mounting assemblies so that the surface of the tonneau section rests on the supporting portion of each of the mounting assemblies;
III. rotating the rotary member so that the engaging portion abuts the opposing surface of the tonneau section and the cover seal compressibly engages the tonneau section; and
IV. rotating a toggle latch to engage a tooth of the toggle latch with a groove of the rotary member.

\* \* \* \* \*